United States Patent [19]

Roberts

[11] Patent Number: 5,812,062
[45] Date of Patent: Sep. 22, 1998

[54] GLASS COATED PIPE SYSTEM AND TESTING METHOD

[75] Inventor: Michael Lee Roberts, Willowdale, Canada

[73] Assignee: Mid-Vent Inc., Willowdale, Canada

[21] Appl. No.: 813,163

[22] Filed: Mar. 7, 1997

[30] Foreign Application Priority Data

Mar. 7, 1996 [CA] Canada .................................. 2171267

[51] Int. Cl.$^6$ ................................................ G08B 21/00
[52] U.S. Cl. ........................... 340/664; 285/55; 65/59.4; 324/456; 118/665
[58] Field of Search .................................... 340/664, 635, 340/660; 285/55; 65/59.24, 59.4; 324/452, 456; 118/602, 622, 665; 356/237

[56] References Cited

U.S. PATENT DOCUMENTS

| | | | |
|---|---|---|---|
| 17,635 | 6/1857 | Pierce | 164/91 |
| 209,103 | 10/1878 | Austin | 285/55 |
| 1,303,102 | 5/1919 | Monrath | 427/239 |
| 2,606,574 | 8/1952 | Lefebvre | 285/55 |
| 2,944,298 | 7/1960 | Bernhardt et al. | 118/408 |
| 2,978,350 | 4/1961 | Wilson | 427/230 |
| 2,998,800 | 9/1961 | Vernooy | 118/669 |
| 3,096,478 | 7/1963 | Brown | 324/514 |
| 3,235,290 | 2/1966 | Young | 285/55 |
| 3,281,308 | 10/1966 | D'Asto | 454/44 |
| 3,729,803 | 5/1973 | Maksutou et al. | 65/59.24 |
| 3,866,114 | 2/1975 | Johnston | 324/452 |
| 4,070,118 | 1/1978 | Maslowski et al. | 356/237 |
| 4,311,505 | 1/1982 | Yasui et al. | 65/43 |
| 4,338,879 | 7/1982 | Makeev et al. | 118/602 |
| 4,702,884 | 10/1987 | Goldstein | 419/8 |
| 5,301,984 | 4/1994 | Farris | 285/55 |

FOREIGN PATENT DOCUMENTS 832395 of 0000 Canada .

*Primary Examiner*—Edward Lefkowitz
*Attorney, Agent, or Firm*—Bereskin & Parr

[57] ABSTRACT

The invention is directed to a piping system for a side wall vented mid-efficiency furnace. The piping system comprises a plurality of sections of steel pipe having a glass coated interior surface. The interior surface is continuous and resistant to corrosion. An electronic testing apparatus and a method for utilizing same in testing for flaws in the glass coating of pipes is also provided.

12 Claims, 28 Drawing Sheets

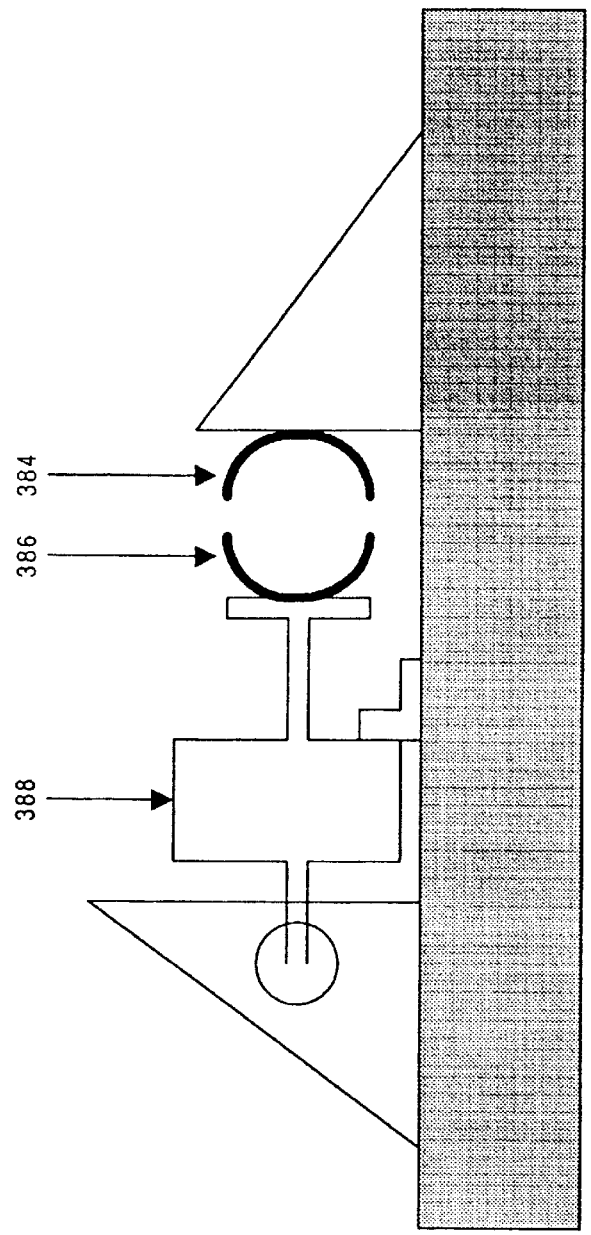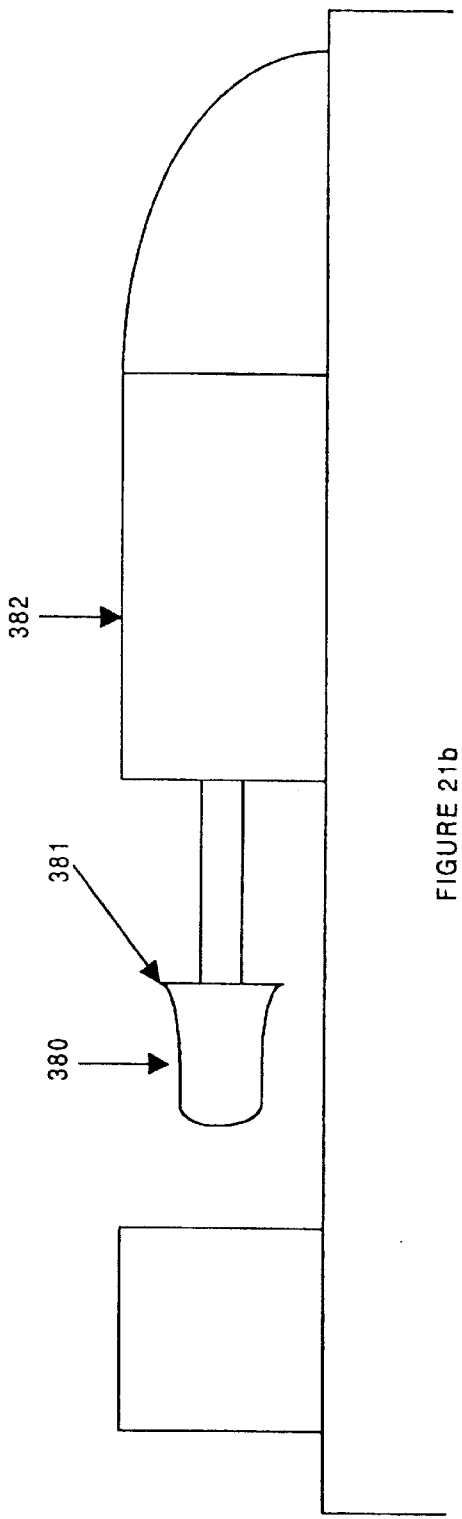

GLASS COATED PIPE SYSTEM AND TESTING METHOD

FIELD OF THE INVENTION

The present invention relates to glass coated pipe systems and to methods for detecting pinholes or other flaws in same.

BACKGROUND OF THE INVENTION

It has become increasingly popular nowadays for buildings to utilize a side wall vent to exhaust flue gases from a heating appliance such as a furnace, water heater or boiler. The side wall vents eliminate the need for a chimney by utilizing a blower motor to force gases through a system of pipes to the outside of a building.

Depending on the efficiency of the heating appliance, different types of vent pipes have been used. For high-efficiency furnaces, the temperature of the exhaust gas is low enough to allow the use of PVC vent pipes. For mid-efficiency heating systems however, the temperature of the exhaust gases is too high for ordinary PVC pipe to be used and pipes made of a special plastic resin are utilized to handle the higher temperatures.

It has recently been discovered however that the side wall vent pipes of mid-efficiency heating systems are becoming corroded from the inside out due to a concentration of acids within the pipes. It was found that the pipes eventually became so corroded that they began leaking at their joints and exhausting dangerous amounts of carbon-monoxide gas into the buildings. As a result, governments have begun instituting bans on the use of plastic side wall vent pipes for mid-efficiency heating systems. Building owners in some areas are now required to either replace the entire mid-efficiency heating system with a high-efficiency heating system, or to replace the side wall vent pipe system with a suitable alternative vent pipe system. While replacing the vent pipe system is likely to be less costly than replacing the entire heating system, to date there has not been a suitable vent pipe developed for use with such mid-efficiency heating systems which the heating industry is confident of.

What is needed is a vent pipe system that is resistant to acid corrosion and that may be installed at existing locations having mid-efficiency heating systems or other applications requiring corrosion resistant piping. The pipe system should be relatively inexpensive to produce and install. Furthermore, methods for testing the system periodically should be developed to ensure that it maintains its corrosive resistance.

SUMMARY OF THE INVENTION

In one aspect, the present invention provides a pipe section for a piping system, comprising:

a hollow core defining an internal passageway, said core having a male end and a female end, said ends opening to said passageway said female end being sized to receive said male end of a corresponding pipe section in a substantially sealed fit;

a stud protruding externally from said core, said stud being sufficiently connected to said core to permit an electric charge to be conducted between and along said core and said stud; and a glass coating disposed continuously over the surface of said passageway.

In another aspect, the present invention provides a vent pipe system for a heating appliance comprising:

a plurality of interconnected pipe sections defining a continuously sealed passageway for venting gasses from the heating appliance to a desired area, each said pipe section having a hollow core defining a portion of said passageway, said core having an open male end and an open female end, said female end being sized to receive said male end of a corresponding pipe section in a substantially sealed fit;

a stud protruding externally from said core of each said pipe section, said stud being connected to said core to permit an electric charge to be conducted between and along said core and said stud; and a glass coating disposed continuously over an inner surface of said passageway for each said pipe section.

In another aspect, the present invention provides an arc tester for testing a hollow pipe having a glass coated internal surface comprising:

an electric power supply;

an electrically conductive body having means for electrically contacting the internal surface of the pipe;

a first electric connector for electrically connecting said body to said power supply;

a second electric connector for electrically connecting said pipe to said power supply; and means for sensing when an electric circuit is completed between said body and said pipe.

In another aspect, the present invention provides a method of testing a hollow pipe having a glass coated internal surface comprising the steps of:

electrically connecting the pipe to an electric power supply;

electrically connecting an electrically conductive body to said power supply, said body having means for electrically contacting the internal surface of the pipe;

activating said power supply;

moving said body from one end of said pipe to the other;

sensing when an electric circuit is completed between said body and said pipe; and determining the position of said body relative to said pipe when said circuit is sensed to locate the position of a flaw in said glass coating.

BRIEF DESCRIPTION OF THE DRAWINGS

For a better understanding of the present invention, and to show more clearly how it may be carried into effect, reference will now be made, by way of example, to the accompanying drawings. The drawings show preferred embodiments of the present invention, in which:

FIG. 21a is a side view of a press for forming a female end for a pipe section in accordance with the present;

FIG. 21b is a front view of the press shown in FIG. 21a;

FIG. 22b is a top view of a guide pipe for use with the punch press of FIG. 22a;

FIG. 23b is a top view of an insert cross for the tee puller device of FIG. 23a;

FIG. 23c is a side view of a male plug for use with the tee puller of FIG. 23a;

DETAILED DESCRIPTION OF THE PREFERRED EMBODIMENT

Figure 1:
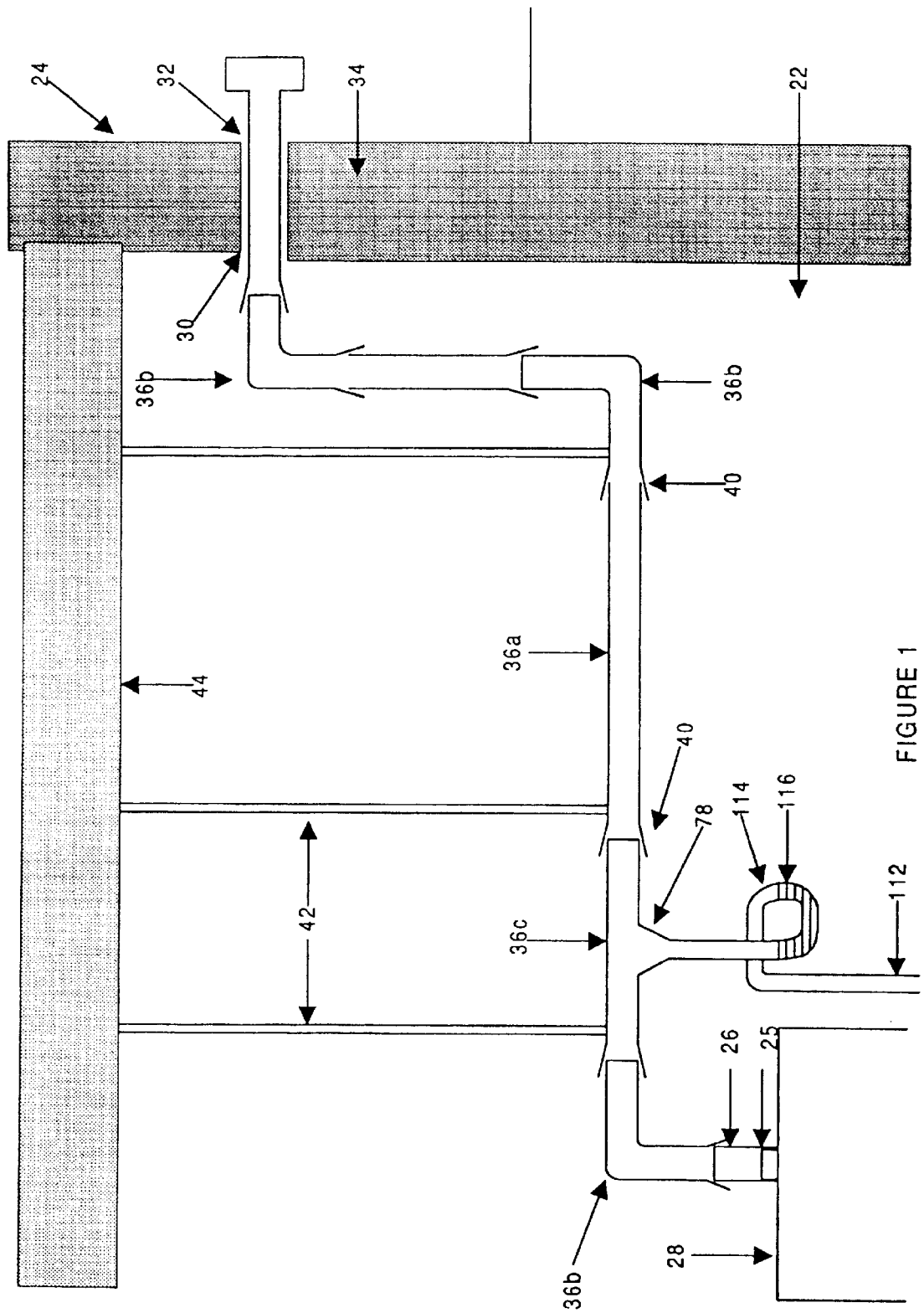
FIG. 1 is a sectional view of a basement of a building showing a side wall vent piping system in accordance with the present invention.

Referring to FIG. 1, a vent pipe system in accordance with the present invention is depicted generally at 20. The vent pipe system is shown installed in a basement 22 of a building 24. The vent pipe system is connected with an adapter 25 to one end 26 to a mid-efficiency heating appliance 28, such as a furnace, water heater or boiler. The other end 30 of the vent pipe system is connected to a wall thimble 32 defined in a side wall 34 of the building. The vent pipe system thus acts to conduct gases from the heating appliance to the vent termination for exhausting the gases outdoors.

Figure 2:
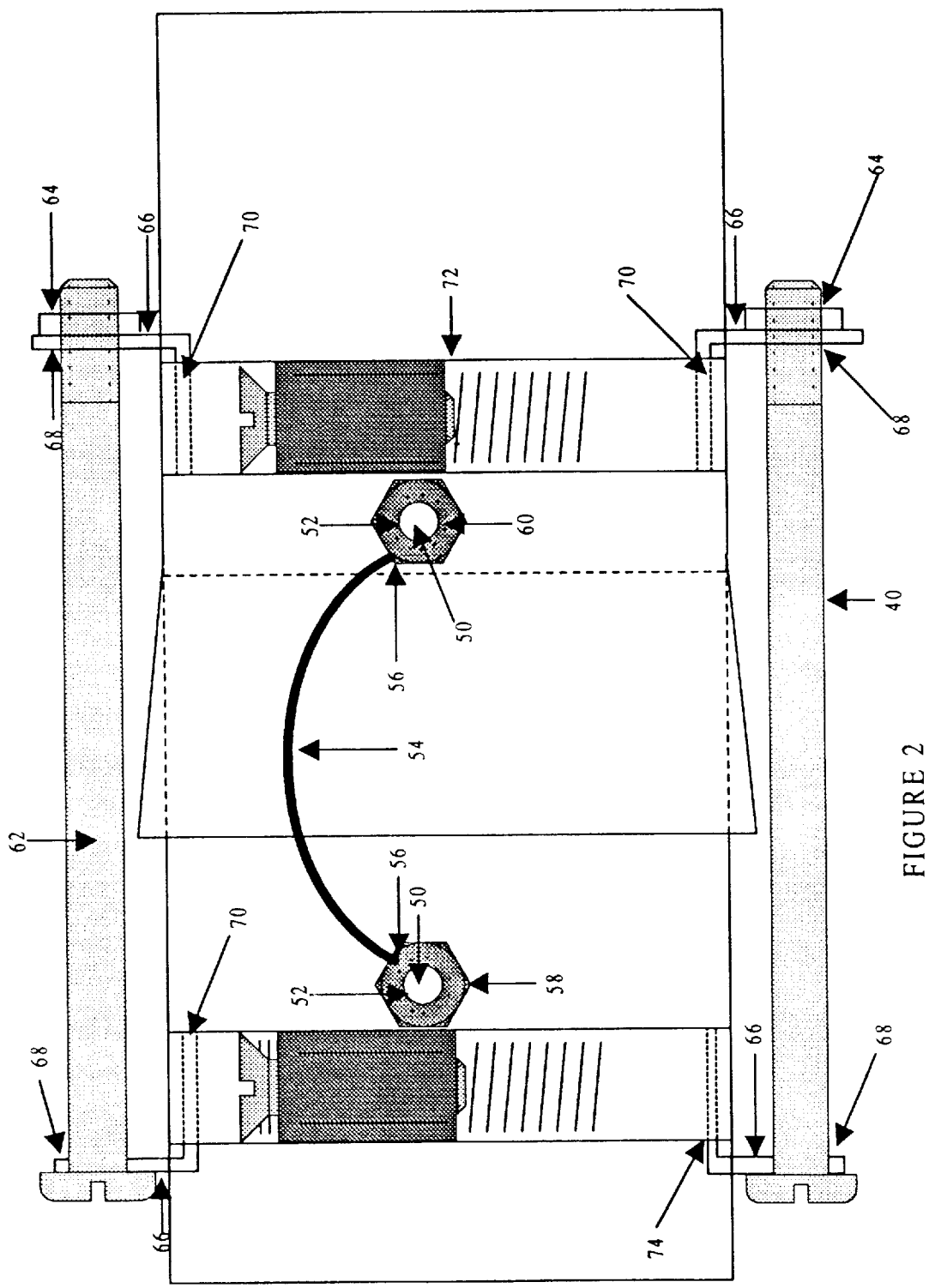
FIG. 2 is a side view of interconnected pipe sections for the vent pipe system of FIG. 1.
Figure 3:
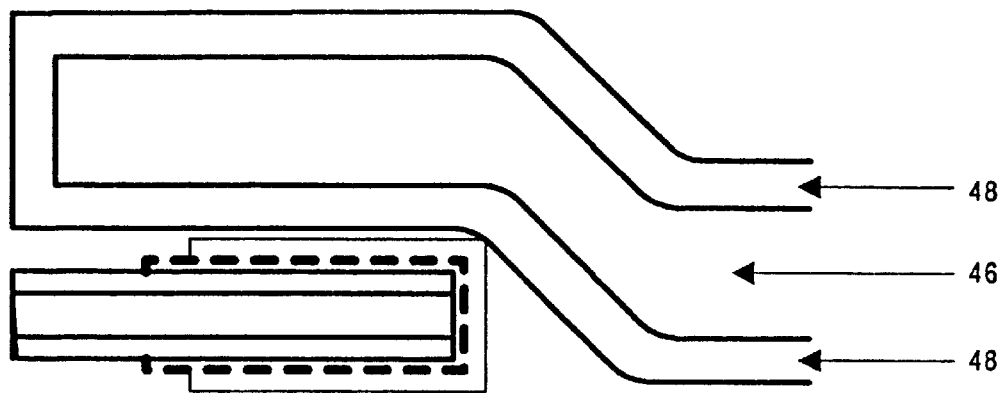
FIG. 3 is an enlarged sectional view of the region marked "3" in FIG. 2.

The vent pipe system includes a number of pipe sections 36 including straight sections 36a, elbow sections 36b and a condensate tee section 36c. Each pipe section has a male end having an outside diameter d and an enlarged female end 40 having an inside diameter D. The inside diameter D of the female end is generally equal to, but slightly larger than, the outside diameter d of the male end to facilitate the snug end-to-end interconnection of adjacent pipe sections as shown in FIGS. 2 and 3. The female ends are located on the heating appliance end of the pipe section relative to the male ends for reasons that will be discussed more fully below. The pipe sections are suspended from hanger straps 42 that loop under the pipe sections and connect to an upper support member such as the sub floor 44 of the building.

Each pipe section comprises a steel core 46 that has a glass coating 48 on its inner and outer surfaces. The glass coating is continuous and subsequently free of any pinholes or other flaws in order to prevent corrosive materials such as concentrated acids from coming into contact with the steel core. The process for making the pipe and applying the glass coating is described in detail below.

Referring to FIG. 2, each pipe section includes radial studs 50 that protrude outwardly from the outer surface of the steel core. The studs are rigidly connected by welds 52 or other suitable means to the steel core of each pipe section. This provides an electrical connection to the steel core, the advantage of which will be described further below. As shown in FIG. 2, the studs on adjacent pipe sections are connected with an electric wire 54 and a solderless crimp connection 56. The studs protrude from diametrically opposed positions on the outer surface of the pipe section. The studs protruding from the male end are located a further distance from the male end face 58 than the studs protruding from the female end are located from the female end face 60.

The adjacent pipe sections are mechanically drawn together using a threaded bolt 62 and nut 64 that is fitted through L-shaped brackets 66. The L-shaped brackets include an opening 68 for receiving the threaded bolt. The brackets include a lower flange 70 that is secured with a hose clamp 72 or gear clamp to the outer circumference of the pipe. The L-shaped bracket abuts against the outside edge 74 of the clamp to facilitate drawing of the pipe sections together. The inside edge of the clamp abuts against the studs to transfer the drawing force to the pipe sections. The clamp prevents the L-shaped bracket from falling off prior to the interconnection of adjacent L-shaped brackets with the threaded bolt. Alternatively, the L-shaped bracket may be secured to the stud with a threaded nut.

In a mid-efficiency heating system such as depicted in FIG. 1, the condensate tee is required to allow accumulations of condensate to be removed from the vent pipe system. It is known that all sections of the vent pipe system slope a minimum of ¼ inch per foot towards the heating appliance. The appliance is at the low point of the slope and the side wall vent is the high point of the slope. A condensate drain 78 must be located as close to the appliance as possible.

With the corrosive condensate flowing downwardly along the pipe system towards the condensate tee, it is important that the male end faces of the pipe sections are protected. It is difficult to glass coat the sharp ends of the pipe sections completely and consistently. To ensure complete protection of the ends, additional protection is required. Ideally, the material protecting the male end face of the pipe will also offer a cushioning feature to help avoid stress on the glass surface.

The preferred protective material is a fluorelastomere sold by Dupont under the trade mark VITON. A gasket ring 59 having a generally U-shaped cross-section is fitted over the male end face of the pipe section. The gasket ring is formed from the VITON™ material and has closed cell air bubbles that increase the cushioning ability of the gasket. The gasket is adhered to the pipe section using a VITON™ caulking. The VITON™ caulking is cut with methylethylketone (MEK). The VITON™ caulking is spread on the male end faces of the pipe sections and extends approximately ¼ inch on both the interior and exterior surfaces of the pipe adjacent to the end face. The VITON™ ring gasket is then placed over the caulking and the male ends of the pipe. The excess caulking is then smoothed along the end of the VITON™ gasket and the glass coated pipe. When the MEK evaporates, the VITON™ caulk cures and forms a bond with both the glass coated pipe and the VITON™ ring. Alternatively, other synthetic elastomers such as ethylene-propylene, chloroprene, nitrile, or perflouro elastomers may be used.

It is important to note that the pipe sections are oriented with the male ends facing upstream relative to the condensate flow. This ensures that the closed end of the gasket ring meets the condensate flow. That minimizes the likelihood of condensate penetrating the gasket ring to corrode the steel core.

Figure 4:
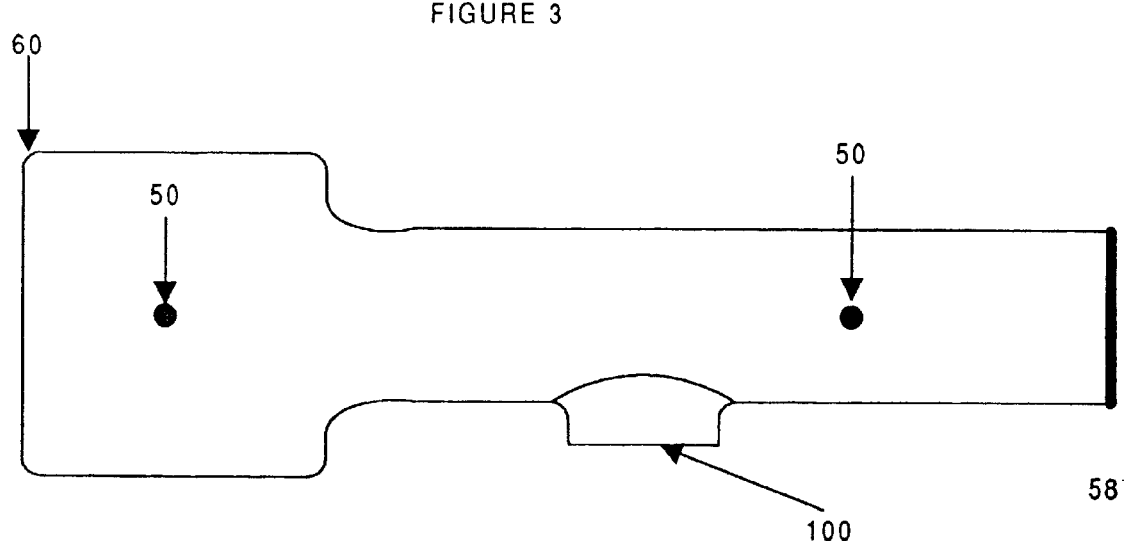
FIG. 4 is a side view of a condensate tee section of the pipe system of FIG. 1.
Figure 5:
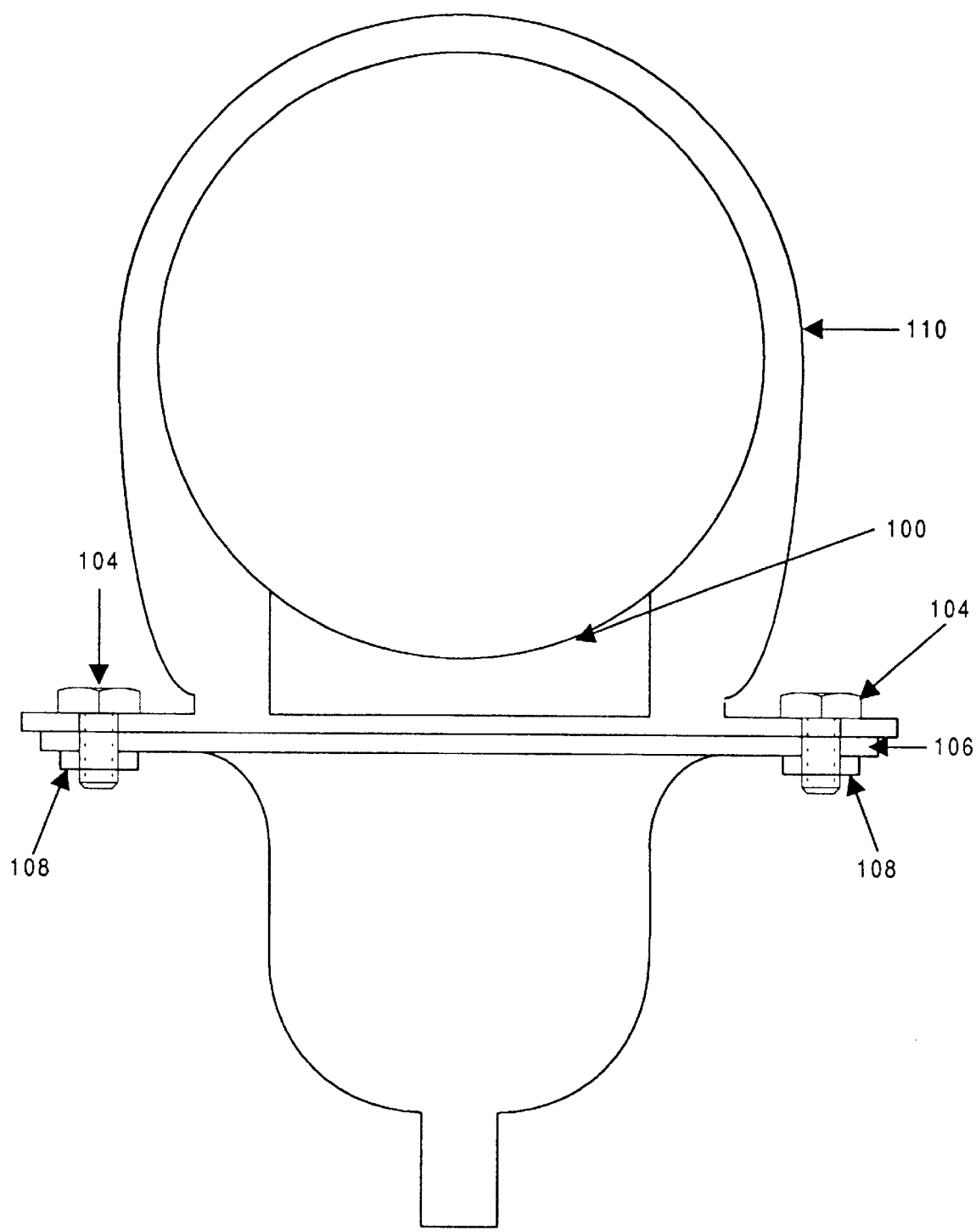
FIG. 5 is a sectional view of a joint between a reducer section and the pipe system of FIG. 1.

In order to allow interconnection, the female end of each pipe section is slightly tapered outwardly to provide extra clearance for receiving the VITON™ gasket fitted to the male end face of the corresponding pipe section. The male end can travel a distance of approximately 3 inches inside the expanded female end of each pipe section. The female end has an internal shoulder 61 having a depth of approximately ⅛ inch. The VITON™ gasket is adapted to abut against the shoulder to offer a pressure type seal. The shoulder has a smooth radius to facilitate an adequate glass coating as described further below. In this manner, there are no surfaces on the interior of the pipe other than glass and the VITON™ gasket which can come into contact with flue gas, acidic condensate or corrosive liquids. The edge of the female receptacle section is the only potentially exposed area but this section is isolated from the interior of the pipe system by the glass coated radius and the VITON™ seal. Referring to FIG. 4, the condensate tee includes the male and female ends as well as a tee flange 100. The tee flange protrudes outwardly from the outer surface of the pipe section with a 90° radius at the base of the flange. The flange is preferably located at the center of the condensate tee section. As shown in FIG. 5, a condensate reducer 102 is attached to the tee flange of the condensate tee to avoid leakage of any exhaust gases. The condensate reducer includes a washer 104 that is used to draw the reducer upwardly into secure engagement with the tee flange. The washer has a pair of threaded studs 106 welded on either side for receiving nuts 108 to facilitate mechanical attachment of the reducer to the condensate tee flange. A steel clamp 110 extends about the circumference of the condensate tee and connects at each end to the ring washer for connecting the reducer to the tee flange. A hose 112 extends in a known manner downwardly from the reducer to a drain opening. The hose includes a looped portion 114 that is filled with water 116 to prevent the escape of flue gas through the hose. The condensate will flow down into the loop and force a corresponding amount of water out of the other end of the loop into the drain.

MANUFACTURING OF STEEL CORE

The steel core is formed from a sheet (not shown) of 16 gauge ASTM 424 Type 1 vitreous enamelling steel which is roll formed into a hollow cylindrical tube having a preferred outside diameter of 3 or 4 inches. The steel is a specially developed from low carbon steel for ceramic coating applications. As will be described further below, the glass coating is applied to the steel core by a dipping process and then heated to high temperatures to bake the coating onto the pipe. It has been found that pitting or bubbling occurs with glass coatings that are applied to high carbon steel. This is because the heat turns the carbon into a gas which blows out through the glass coating during baking. Low carbon steel reduces the likelihood of this happening. The glass coating, which is water based, also contains soluble hydrogen which becomes trapped in the voids left by the carbon. The preferred steel formulation absorbs the hydrogen gas as both materials cool to prevent the coating from forming bubbles and pitting.

The steel sheets are fed in known manner through a series of rolling dies (not shown) to form the tube shape and then are welded together with high frequency electrical resistance welding (ERW). While the weld is still soft due to the high temperature of the welding process, the welding flash on both the inside and outside of the steel core is eliminated. This is accomplished by either cutting the excess weld using a hardened cutting tool on both of the inside and outside tube (this process is known as flash removal) or using a set of rollers positioned in the same location on the interior and exterior of the tube and applying enough pressure to force the sharp irregular shaped welding ridge back into the tube to form a perfectly smooth surface (this process is known as flash rolling). It is important that the weld be removed because the subsequently applied glass coating will not coat the sharp spiked ridge of a weld flash without leaving a series of pinholes.

Once the steel core is formed, it is cut to the desired lengths for installation into a finished pipe system. After cutting, the ends of the steel core are deburred and smoothed in known manner to facilitate application of the glass coating.

Prior to applying the glass coating, the radial studs are welded to the outer surface of the steel core for each pipe section. In welding the studs to the steel core, the temperature of the weld should be carefully controlled. To control the temperature of the weld when attaching the radial stud, a high frequency compacitor discharge stud welding process is used. If the temperature of the weld is too high, the oil used in rolling and milling the steel will be burned into the steel surface on the opposite side (interior side) of the tube. The oil contains carbon which could become imbedded in the steel if the temperature is too high. The carbon cannot then be removed during a subsequent cleaning process which is necessary to prepare the steel tube for glass coating. If the surface of the steel contains the carbon from the oil, this carbon becomes gaseous and will migrate outwardly from the steel core during the firing process for the glass coating. This will leave a pitted area where the carbon gas has displaced the molten glass as it moved outwardly from the steel core.

Prior to applying the glass coating, the elbow sections of the pipe are formed. This is accomplished in known manner by utilizing an interior mandrel (not shown) to prevent the interior of the tube from collapsing and restricting the flow rate within the bent area. The mandrel (a ball-shaped tool) remains in the interior of the steel core while a hydraulic arm (not shown) bends the steel tube to a desired angle (e.g. 90°).

The mandrel is then withdrawn from the tube leaving the inside diameter of the tube consistent throughout the bend.

Figure 6:
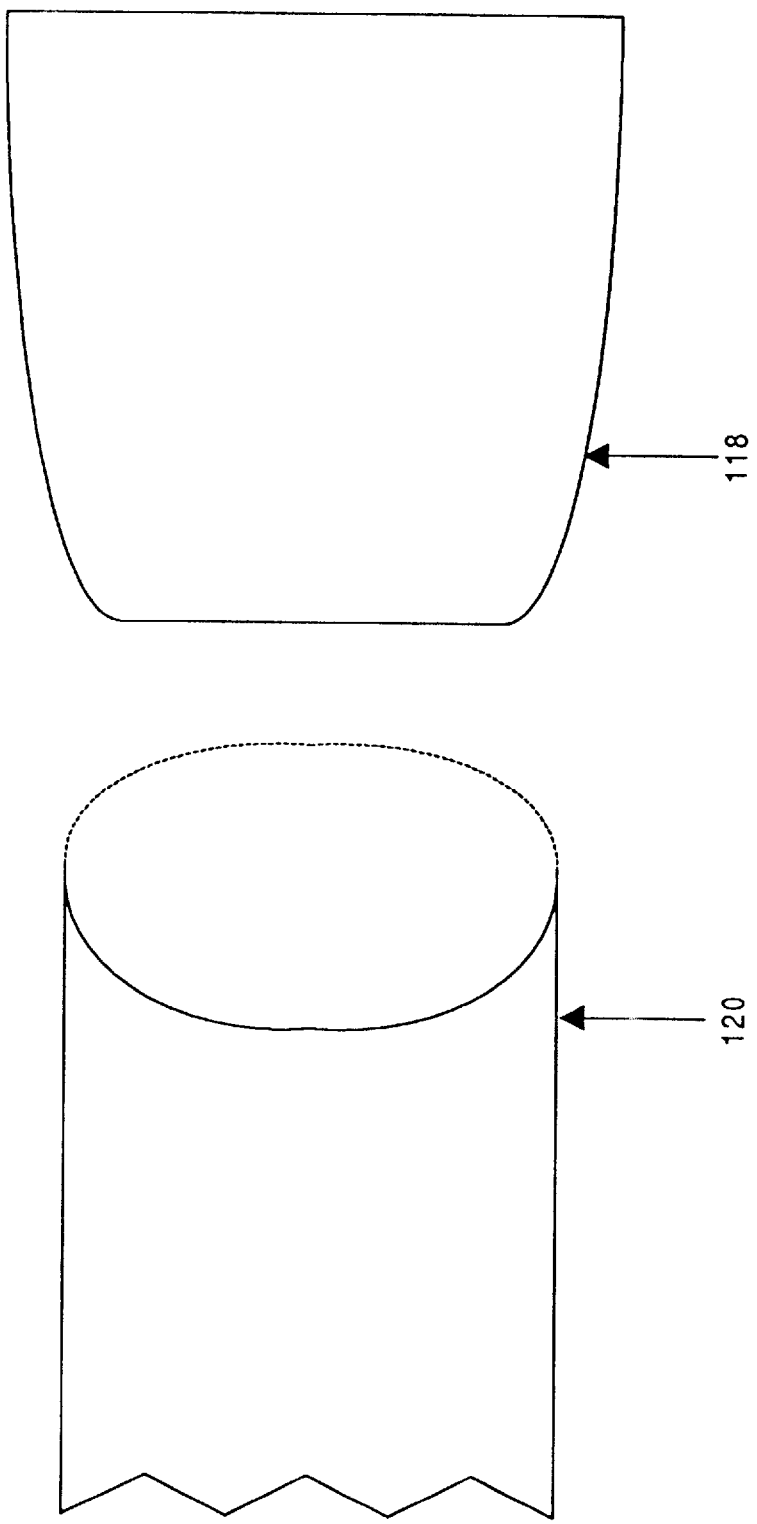
FIG. 6 is an exploded view of the press elements for forming the enlarged female end of the pipe sections for the system of FIG. 1.

The male and female ends of each pipe section are also formed prior to applying the glass coating. The female end has an expanded portion that preferably extends for approximately a 3 inch length of the steel core. The expansion portion of the female end begins at nominal diameter plus 195 thousandths of an inch and tapers outward to the end of the tube which is 210 thousandths of an inch larger than nominal diameter. As shown in FIG. 6, the female end is formed by forcing tapered tool 118 inside the end of the steel core to force the steel to expand outwards. The exterior shape is controlled by a hardened steel mold 120 to facilitate formation of the female end to precise tolerances. Alternatively, expansion of the female end can be accomplished by a set of expanding fingers (not shown) powered by a hydraulic press which forces a tapered rod into the center of a set of fingers forcing the fingers to expand.

It is also necessary to form the condensate tee prior to applying the glass coating. A conventional welded pipe tee is not acceptable because the glass coating will not fully cover the welds or sharp edges. Accordingly, the condensate tee is fabricated by drawing the steel of a cylindrical steel core outwardly from the side of the core to form a 2 inch round tee flange. The steel is drawn out by first punching an oblong hole (preferably ⅞ inch by 1.5 inches) that is oriented with its long dimension extending along the length of the steel core. If the hole is not oblong, it has been found that the steel core will split when drawn out of the side of the tube. The steel is then drawn out of the side of the tube by one of the following preferred methods.

Figure 7:
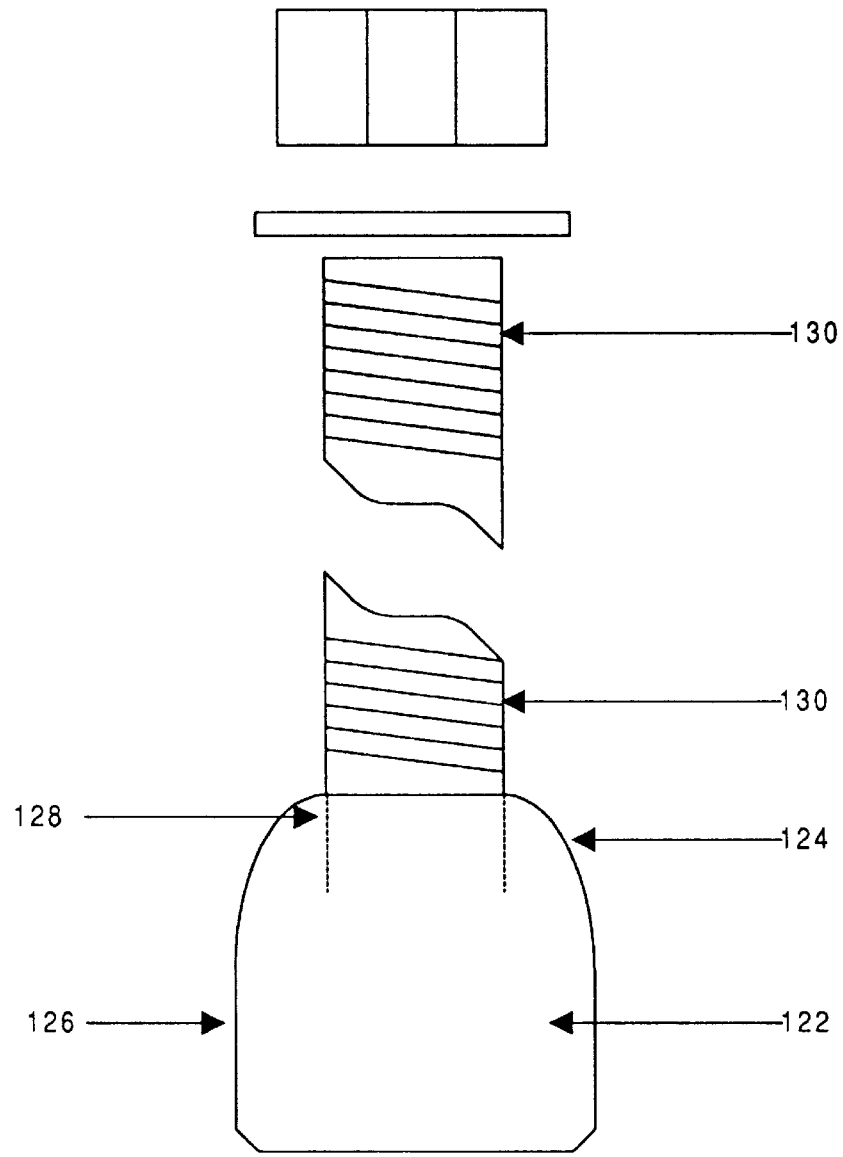
FIG. 7 is a partial exploded view of a male plug for a tee flange tool for forming the condensate tee of FIG. 4.

In the first preferred method, as shown in FIG. 7, a plug 122 with a rounded top 124 and tapered sides 126 is pulled from the inside of the steel core until it is completely out of the core. The top of the plug has a hole 128 drilled into the body of the plug which is tapered and threaded. The plug is pulled by a threaded rod 130 which is screwed down into the plug. Alternatively, the rod can use a locking key to secure itself into the plug.

Figure 8:
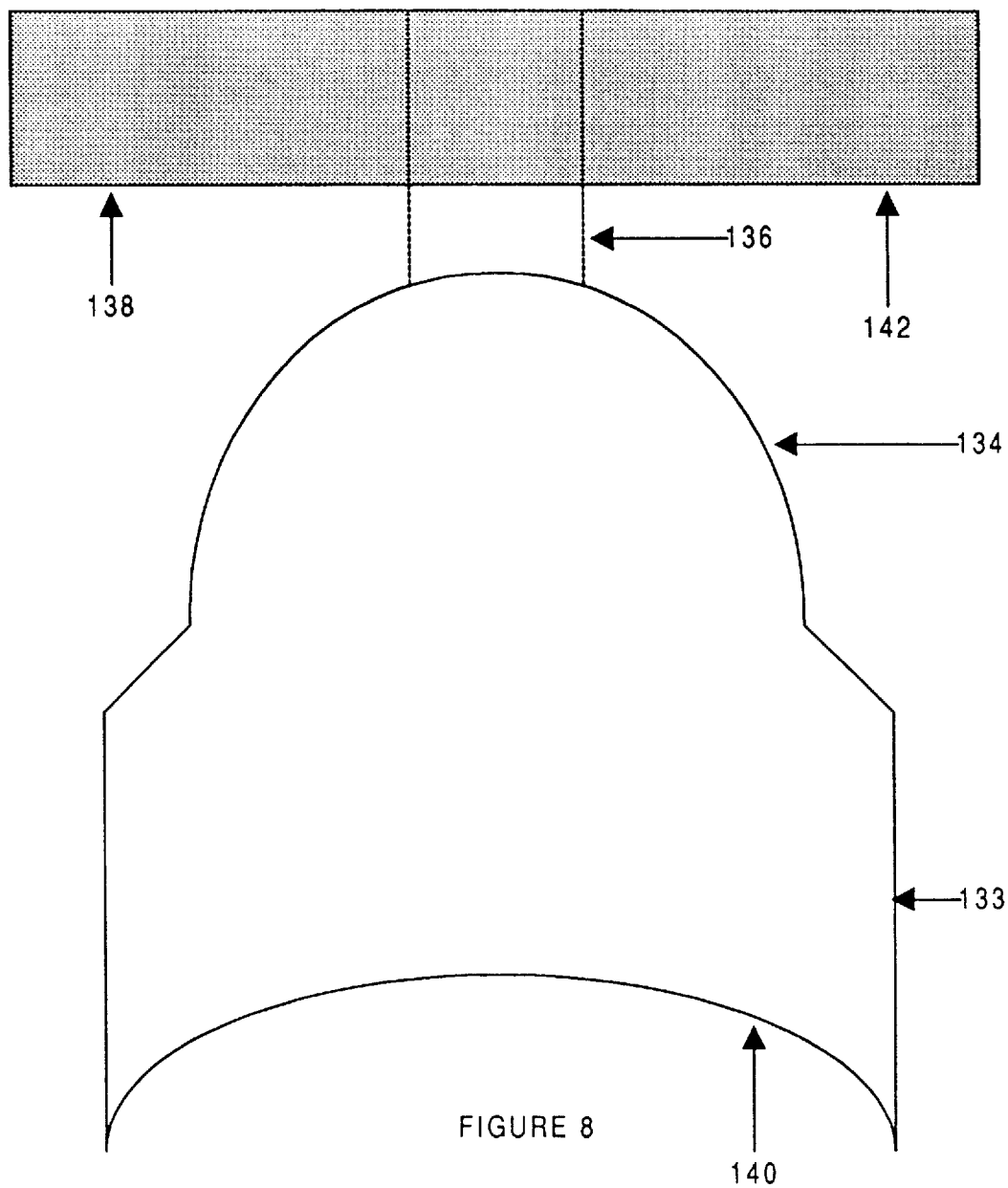
FIG. 8 is a side view of a female receptacle for the tee flange tool of FIG. 7.
Figure 9:
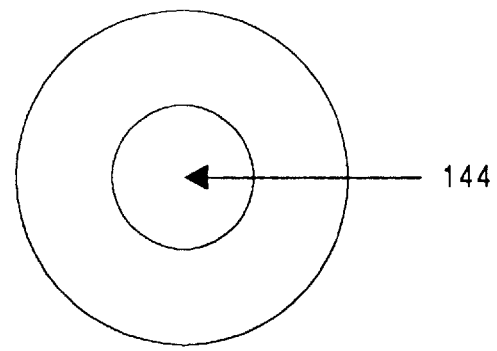
FIG. 9 is a bottom view of the female receptacle of FIG. 8.

To prevent the steel from pulling out of the side of the tube uncontrollably, a female receptacle 132 is employed as shown in FIGS. 8 and 9. The female receptacle comprises a rod 134 made of hardened tool steel. The rod has a central hole 136 which allows sufficient clearance to draw the plug through the side of the tube and form the steel out of the side of the tube. One end 138 of the female receptacle is cut at a 90° angle and the other end 140 is machined either at a 3 inch or a 4 inch radius. The tool cut on a 3 inch radius is for drawing the tee from a 3 inch tube and the tool cut on a 4 inch radius is for drawing the tee from a 4 inch tube. The machine's 3 and 4 inch radiuses can then rest securely on the outside of the steel tube from which the tee will drawn out of.

At the interior point of the female receptacle where the interior hole meets the surface of the exterior of the tube, the sharp 90° angle of the female receptacle must be rounded to allow the metal being drawn out of the side of the tube to form a smooth radius. This smooth radius is critical for suitable glass bonding.

At the end of the female receptacle which has been cut at a 90° angle, a circle of steel 142 is welded to the top of the receptacle and a hole 144 is drilled in the middle of the steel circle. This provides a strong point to pull against as the rod which is connected to the plug is pulled through the side of the steel tube.

In use, the 2 inch plug is inserted inside the tube and the rod is then attached to the plug protruding at a 90° angle from the tube. The female receptacle is then placed over the tube. The 3 or 4 inch machined radius (of the female receptacle) will rest on the exterior contour of the steel tube. The rod connected to the plug extends through the hole on the top of the circular top plate welded on the top of the female receptor. A nut 146 can then be screwed onto the threaded rod and tightened and thus draw the plug through the female receptacle. Alternatively, a hydraulic cylinder (not shown) can be fixed to the rod and pressed against the circular plate drawing the plug through the side of the steel tube.

As the plug enters the female receptacle, the steel of the tube is drawn into the clearance space between the plug and the interior of the female receptacle. This forms the metal into a 2 inch tee drawn out of the side of the tube with a smooth rounded radius at the base of the flange which the glass coating can easily bond to. The flange preferably extends ¼ to ½ inch out passed the side of the tube. Any irregularities of the end edges of the drawn tee can be belt sanded to give a flush surface to the end of the 2 inch extrusion if necessary.

Figure 10:
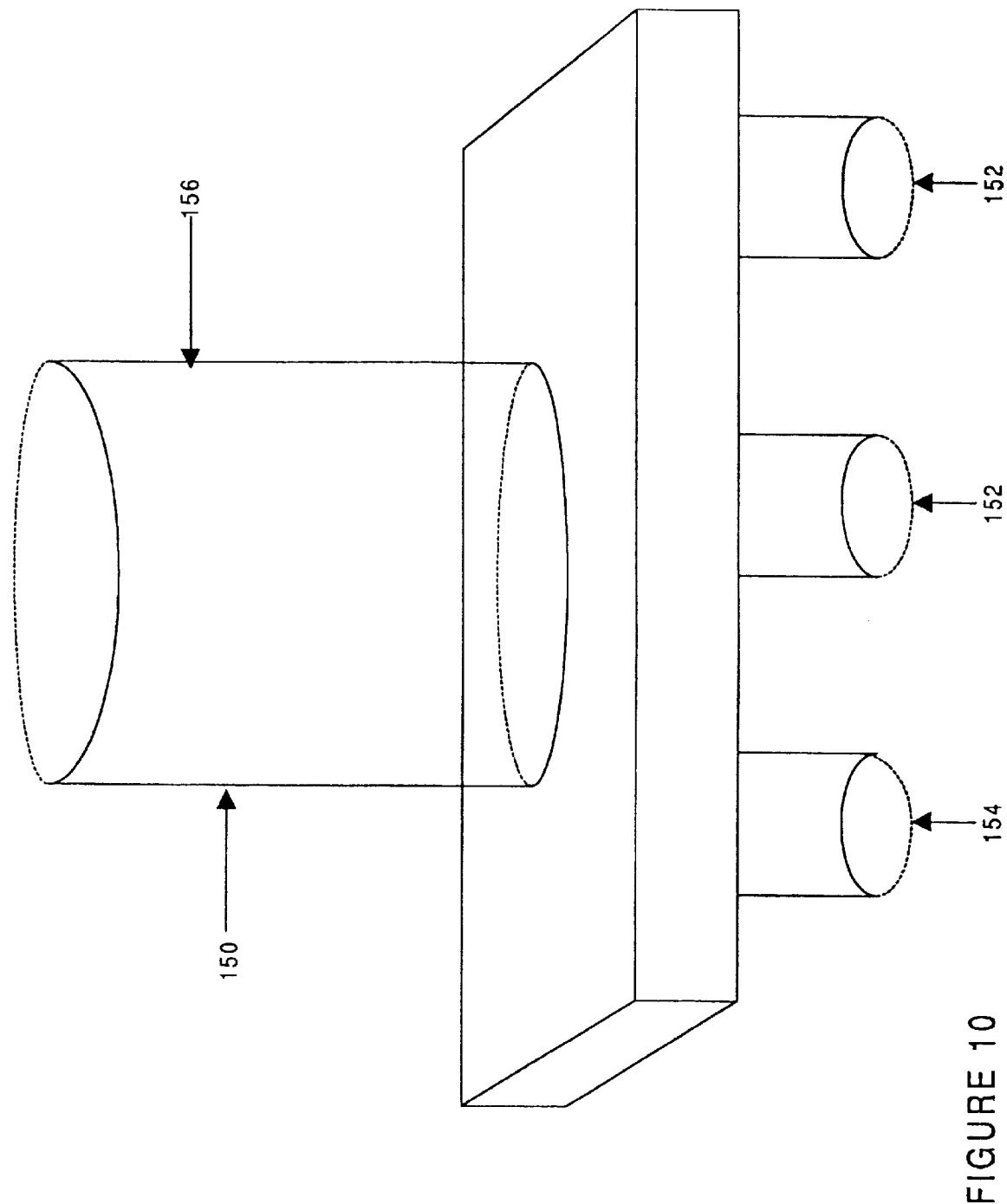
FIG. 10 is a perspective view of a horn press die for an alternate method of forming the condensate tee of FIG. 4.
Figure 11:
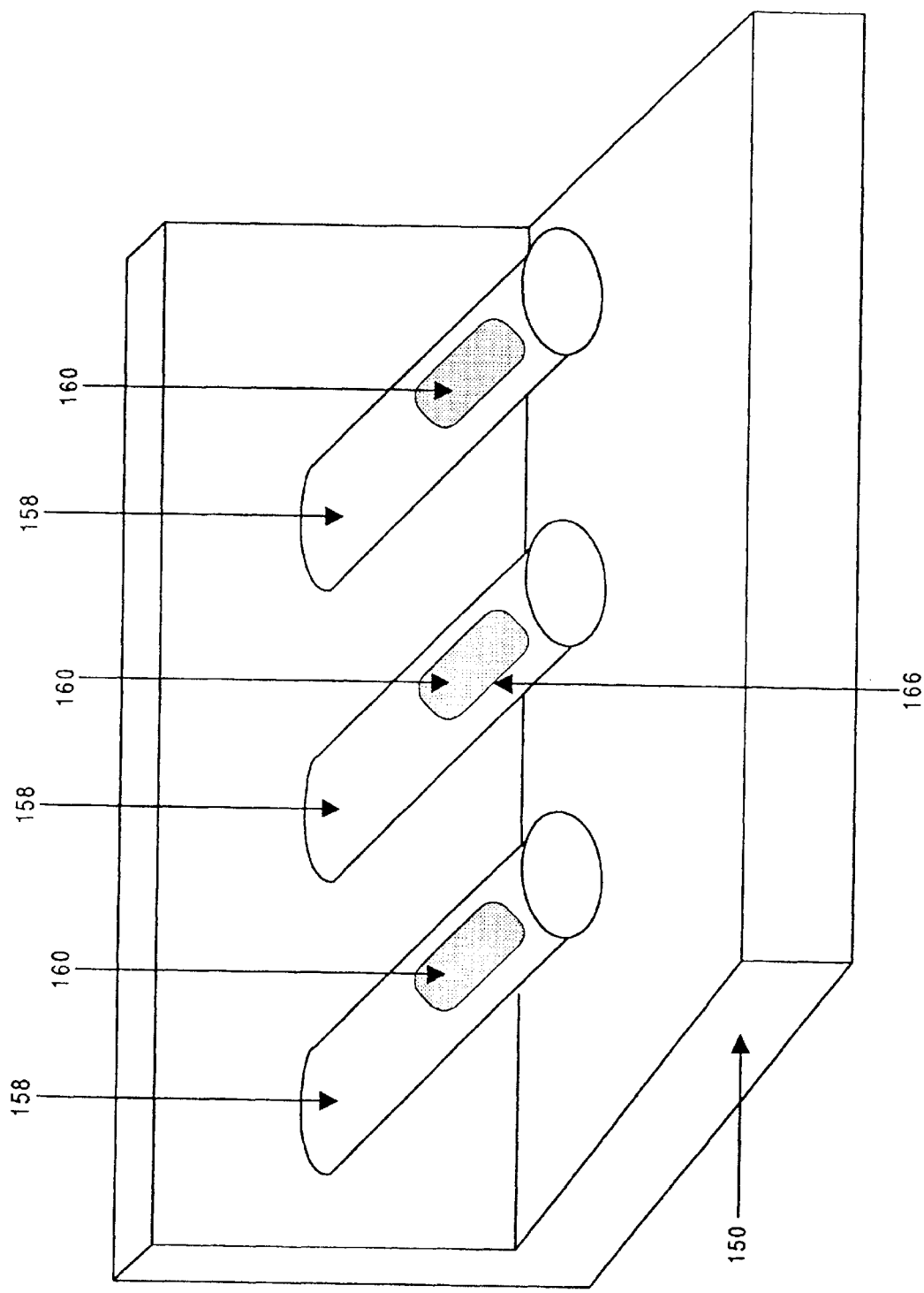
FIG. 11 is a perspective view of a horn press receptacle for the forming method of FIG. 10.

A second method for forming the tee utilizes a horn punch press 150 as shown in FIGS. 10 and 11. To utilize the punch press, two female receptacles 152 and one male punch die 154 are connected to a punch press cylinder 156 which presses down on a set of 2 inch round bars 158 which support the forming and punching dies 160 which form the metal flange. These support rods are permanently attached at one end to a solid steel support 162. The support rods are raised high enough off of the bed of the punch press by the steel support to allow the steel tube which is to be fabricated to be slid over the rods. The shaping and punching dies can then shape the metal from inside of the tube. The suspended ends of the supporting rods are braced with a removable steel support to prevent the press cylinder from bending the support rods.

The male punch die has ⅞ inch by 1.5 inch oblong face 164. The 1.5 inch section of the punch die runs parallel with the length of the tube. The ⅞ inch section of the punch runs across the width of the tube. The female receptacle for the punch die is the same dimension plus 0.005 inches added clearance to allow the male portion to enter the female and sheer the steel of the tube when the punch press cylinder comes down. A 1 foot section of round steel tube is then slid over the supporting rod and female punch receptacle. The end of the supporting rod is then braced with a steel support to prevent the pressure of the press cylinder from bending the support rod down. The punch press is now engaged bringing the set of tools fixed to the press cylinders down on the support rods. This punches an oblong hole running lengthwise along the tube.

The next step involves a 2 inch round rod which has a forming die 166 on the top of the rod which protrudes upwards 3⁄16 inch. This forming die is 1.75 inches at the base. The bottom of the forming die is machined on a 2 inch radius so that the forming die can protrude upwards at a 90° angle from the supporting rod and yet rest on the 2 inch rod. The top of the forming die is 1.25 inches wide. The forming die is rounded on the top for the first ½ inch from the top. A female receptacle is attached to the punch press cylinder which presses down onto the rod and forming die. The female receptacle is machined in the mirror image of the rod and forming die less 0.1 inch on all of the surfaces, and in contact with the forming die to allow for the thickness of the steel being formed.

The 1 foot piece of 16 gauge steel tube with the oblong hole is placed over the supporting rod and forming die. The center of the forming die is positioned in the middle of the oblong hole. The end of the supporting rod is then braced with a steel support to prevent the pressure of the press cylinder from bending the support rod down. The punch press is now engaged. When the punch press cylinder presses down on this forming tool, the top of the forming tool enters the ⅞ by 1.5 inch oblong hole and forces the steel material of the tube outwards and upwards.

The final step is the same as the previous step except that the forming die is a full 2 inches at the top and sides and extends ½ inch above the supporting rod. The forming is rounded at the inner section of the forming die top and side. The rounded section is ¼ inch radius.

The condensate tee reducer must also be formed prior to the application of the glass coating. Since the glass coating does not coat properly on sharp edges, the reducer must gradually reduce from the 2 inch opening to the ½ inch reduced opening. This is accomplished by spinning an ASTM 424 type 18 or 20 gauge steel disk into the proper shape. The steel is placed onto a spinning lathe between the lathes' tail stock and the spinning die. The disk is then spun at approximately 1,500 rpm. and formed or pressed against the spinning die. As the disk is pressed against the die, it assumes the contour of the die.

The top of the reducer is 2.4 inches long. This allows 0.2 inches clearance around the condensate tee flange. This clearance area accommodates a fluoroelastomeric U-shaped VITON™ ring gasket. The reducer needs a lip to securely fit into the condensate tee flange. This vertical lip wall comes down from the top of the reducer 4.4 inches. This lip wall tapers from 2.5 inches from the top of the lip to 2.3 inches at the bottom of the vertical wall of the lip. Over the distance of the next 0.1 inch, the reducer quickly reduces horizontally to a diameter of 2 inches. This completes the portion of the reducer forming the lip. This lip can now fit securely up against the condensate tee flange.

GLASS COATING PROCESS

The process for applying the glass coating to the steel core comprises the following broad steps:

(1) porcelain enamel formulation;

(2) preparation of slip (liquid enamel);

(3) pre-treatment of steel cores (cleaning);

(4) dipping of cores in slip;

(5) firing dipped cores; and (6) periodically testing completed product.

Each of these process steps are described in more detail below.

1. Enamel Formulation

The glass coating comprises a porcelain enamel formulation that is developed using empirical methods to achieve appropriate levels of primary and refire bonds, acid resistance, coating continuity, rheological stability, and slip aging characteristics. In the preferred embodiment, the porcelain enamel formulation is as follows:

| Ingredient | Amount |
| --- | --- |
| XG-639 | 270 lbs. |
| XF-127 | 30 lbs. |
| Red Label Clay | 15 lbs. |
| T Clay | 6 lbs. 12 oz. |
| Bentonite | 9 oz. |

-continued

| Ingredient | Amount |
| --- | --- |
| Decahydrate Borax | 1 lb. 8 oz. |
| Magnesium Carbonate | 12 oz. |
| Potassium Carbonate | 9 oz. |
| "Setithr" | 3 oz. |
| Potassium Nitrate | 6 oz. |
| Kelzan | 64 g |
| FCP-25 | 2 lbs. 4 oz. |
| Water | 18.6 gal. |

2. Preparation of Slip

Once the formulation is determined, the ingredients are loaded into a ball mill and rolled until the desired particle size is obtained. The fineness of the particle size is determined by wet washing a 50 cc sample through a 200 mesh sieve and volumetrically measuring the amount retained on the sieve. The target amount is 7 g plus or minus 1 g retained.

Once the slip is milled to the correct fineness, the mill is strained through a 40 mesh sieve into a polyethylene holding tank. The slip is then pumped using a diaphragm pump onto a vibratory sieve and must pass a 60 mesh screen. This material then gravity feeds past two bar-grate magnets to separate out any fine iron particles. This slip is then gravity fed into a clean polyethylene storage tank. It should be noted that great care must be taken to ensure the enamel slip is not contaminated by any other material especially any organic compounds as this will cause surface defects resulting in coating failure.

The processed enamel slip must then be adjusted to the appropriate specific gravity and viscosity. Gravity is measured by weighing 100 cc of slip and dividing the weight by 100. Viscosity is measured by an empirical test when a 12 inch by 12 inch plate is dipped into the enamel and its "picked up" weight is measured. The target specific gravity is 172 g per cc plus or minus 1 and the target pickup weight is 94 g per square foot plus or minus 3.

If the enamel is not at the target's specific gravity or viscosity, it must be adjusted to ensure workable rheological properties in the dipping process. If the specific gravity is too high, water is added to lower it. If it is too low, the enamel must be left to stand for a period of time until clear water has risen to the top. This clear water is then decanted leaving a higher gravity slip. If the pickup is too low, it is increased by carefully adding a dilute solution of sodium nitrate. If the pickup is too high, it can be lowered by slowly adding a dilute solution of tetrasodiumpyro phosphate.

The enamel slip is stored at or below 70° F. in a covered polyethylene tank to prevent accelerated thermal aging during the summer months. Covering the enamel aids in preventing contamination of the slip.

3. Treatment of Steel Cores

Raw steel cores must be cleaned prior to coating to remove soils that would cause surface defects that would result in coating failures. The specific soils to remove include general shop dirt that adheres to the oily core surface, metal filings resulting from core cutting and hole drawing processes, mineral oil rust preventive solution on the surface of the steel sheet at the steel mill (prior to steel core formation), rolling lubricants left on the steel during the fabrication of the steel core, loose carbonized mill oils present at the weld seam burned into the steel during the seam welding of the tube, and mineral oil or chlorinated paraffin or other like materials used during the heavy drawing processes during the bonding of elbows and expansion of tubing ends.

Prior to dipping, the steel cores must be cleaned as follows. Various lengths of cores are loaded into a cage fabricated from ½ inch by 30 inch stainless steel in such a way as to allow a free emersion of all core surfaces and not to entrap air in elbows or the like. The cage is lifted using an overhead crane and dipped into a first cleaner tank. After the appropriate time, the cage is transferred to a second cleaner tank or a polishing tank. After the appropriate time, the basket is removed from the polishing tank and transferred to the hot rinse tank. During the summer months, a fourth emersion may be necessary in a weak amino solution to preventing rusting of the cores in process.

The first cleaner tank is charged with 8 oz. per gallon of KIM CLEAN 552™, a unsilicated sodium hydroxide cleaner. The bath operating temperature is maintained between 160°–180° F. and the emersion time is set at 20 minutes. The second cleaner tank or polishing tank is charged with 8 oz. per gallon of VANCAM 38™ which is a similar unsilicated sodium hydroxide based cleaner but with the addition of 10 liters of VANCAM 25™ a co-solvent to promote solution stripping prior to rinse. The bath temperature is maintained between 160°–180° F. and the emersion time is set at 20 minutes. The hot rinse tank has no additions and is maintained between 130°–150° F. with an emersion time of 10 minutes. If required, the rust inhibiting bath is made up with a ¼ oz. per gallon of ATO KIM SF 915™ which is an amide solution. The bath temperature is maintained at between 160°–180° F. and the emersion time is 10 seconds. All emersion tanks are filled using tap water that is otherwise untreated with a 190 grain hardness. Compressed air is discharged into the bottom of all of the tanks to promote agitation of the solutions.

The presence of any organic contaminate on the surface of the steel cores will cause a surface defect that will result in a flaw in the glass coating. The following test has been developed and is applied to tubes after the hot rinse stage of pretreatment. The test should be conducted prior to the rust inhibitor emersion since the amide film tends to produce erroneous test results. In other words, the test should be conducted after the hot rinse bath but before the rust inhibitor bath. The test uses the interaction of the steel surface and solutions that vary in alcohol to water ratios. The higher the amount of alcohol, the easier the solution will spread by overcoming surface tension energies on the steel. The cleaner the steel, the lower the amount of alcohol in the solution required to overcome surface energies. 10 bromothymine blue (BNB) solutions with 1.5 g per 100 mL are prepared and put into dropper bottles. The results are then compared against the following rating table:

Rating Table

| Rating | BMB Solution | Methanol | Water | Remarks |
|---|---|---|---|---|
| 0 | 8 | 72 | 0 | Poor |
| 5 | 8 | 68 | 4 | Poor Plus |
| 10 | 8 | 64 | 8 | Fair Minus |
| 20 | 8 | 56 | 16 | Fair |
| 30 | 8 | 48 | 24 | Fair Plus |
| 40 | 8 | 40 | 32 | Good Minus |
| 50 | 8 | 32 | 40 | Good |
| 60 | 8 | 24 | 48 | Good Plus |
| 70 | 8 | 16 | 56 | Excellent |
| 80 | 8 | 8 | 64 | Excellent |

The steel cores that are fresh from the hot rinse bath must be tested at a 60 rating or better to pass the cleanliness test. As the steel cores are exposed to the shop air, the rating will quickly deteriorate over time (an 80 rated steel core will deteriorate to a 60 rating after 40 minutes).

4. Dipping of Steel Cores in Enamel Slip

The liquid enamel is pumped from the storage tank into a dipping tank using an air operated diaphragm pump. The dipping tank is approximately 18 inches deep by 72 inches long by 12 inches wide with drip trays on each side. The tank is followed by 20 feet of drip trays used to catch the drips for the purpose of reclaiming the dripped coating for reuse. The threaded studs on each of the pipe cores are covered as described previously with sections of ¼ inch interior diameter PVC plastic tubing which is closed at one end to prevent enamel from coating the threads of the studs. The tube is then picked up by hand and dipped into the enamel slip and slushed around to ensure that no air remains inside the steel cores. The coated steel cores are then withdrawn from the slip and hung to a furnace chain using 330 s.s alloy "S" hangers. The steel cores are allowed to travel on the furnace chain for two to three minutes to allow the liquid slip to stabilize and stop dripping from the ends of the cores. At that point, the PVC plastic sleeves positioned over the studs are removed for reuse and any beads of enamel that have formed at the bottom of the cores is removed to ensure that there is no excessive buildup of enamel on the steel core.

Coating that has dripped from the steel cores onto the trays is salvaged into a holding tank for collection. Care is taken that there is no contamination of the reclaimed material due to sloppy shop practices. The collected material is returned to the mill room area where it is mixed using a high sheer "dissolver" type mixture and adjusted for a specific gravity. The addition of water is usually required due to the evaporation process that takes place on the drip trays. The resultant reclaimed slip is then passed through the vibrating screener and magnetic separator and subsequently readjusted for viscosity and pickup. The reclaimed enamel slip may then be reused at a rate of up to 25% after checking the coating integrity by processing a sample of 100% reclaimed slip. Excess reclaimed amounts may cause Theological instability resulting in coating thickness variations.

5. Firing of Coated Steel Cores

The steel cores are processed through a gas fired radiant tube furnace and are drawn through the furnace by an overhead conveyor chain. The conveyor chain carries 330 stainless steel racks through the furnace suspended by a series of alloy drop rods connected to the conveyor. The coated cores are suspended from the racks using alloy "S" type hooks. The furnace is broken into four zones for purposes of temperature control with the set points all at 1560° F. The chain speed is adjusted to allow the coated cores approximately 3½ to 4 minutes in the hot zones of the furnace. Once the cores have cooled sufficiently to allow handling, they are off loaded from the furnace chain for inspection. Cores requiring an additional coating are passed back to the dipping area for a repeat of the dipping process.

6. Testing of Coating

To determine if the coating has been processed properly, several tests are routinely conducted to ensure quality coating. A coated pipe section is selected periodically and cut using an abrasive wheel to a dimension of ½ inch wide by ½ long taking care to shield the coating surface from flying slag during the cutting process. The sample is mounted on a 30° polishing jig and fine polished as a standard metallurgical cross-section. Examination under a microscope with light field illumination should show an even distribution of small and medium sized bubbles throughout the thickness of the enamel. Any significant migration of the bubble structure away from the glass-metal interface indicates that excessive heat has been applied. Under dark field illumination, the area of the dissolved iron in the glass coating should be easily

13 identifiable. This layer of dissolved iron should be ¼ to ⅓ of the enamel layer. Samples are also tested for mechanical adhesion of the glass coating to the steel. This is simply done by impacting the end of the tube with a hammer and observing the amount of glass that breaks off. No bare areas should be left on the steel. All areas of the steel should still have black glass tightly adhered to the surface. The presence of any bare (grey or silver) steel after impact constitutes a failure.

PORTABLE PIPE TESTING APPARATUS

Once the pipe system is installed in a building, it is desirable to test periodically that no flaws in the glass coating are present. If a flaw is discovered, the flawed section of pipe can be removed and replaced with an unflawed section.

Figure 12:
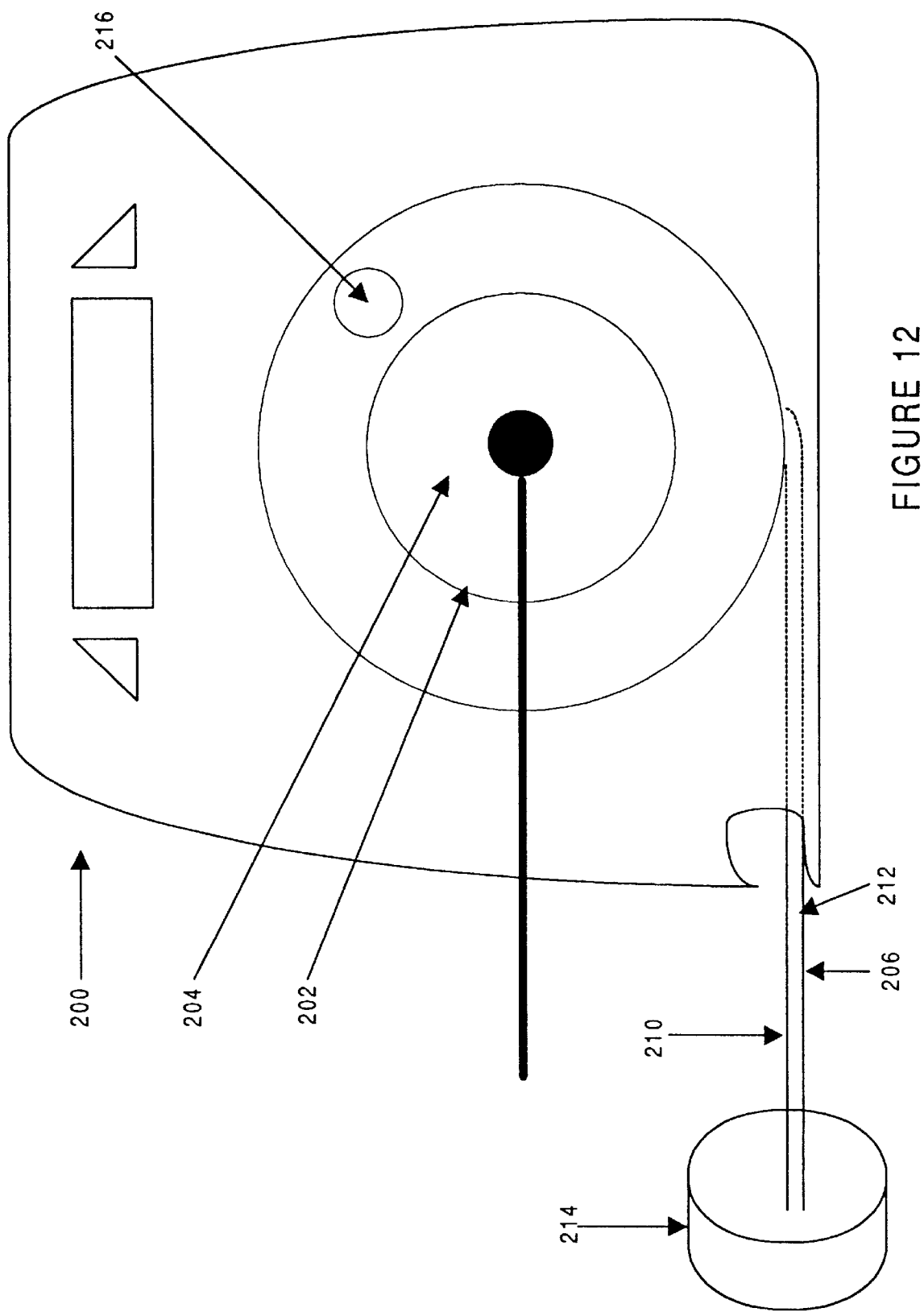
FIG. 12 is a perspective view of a pipe testing apparatus in accordance with the present invention.
Figure 13:
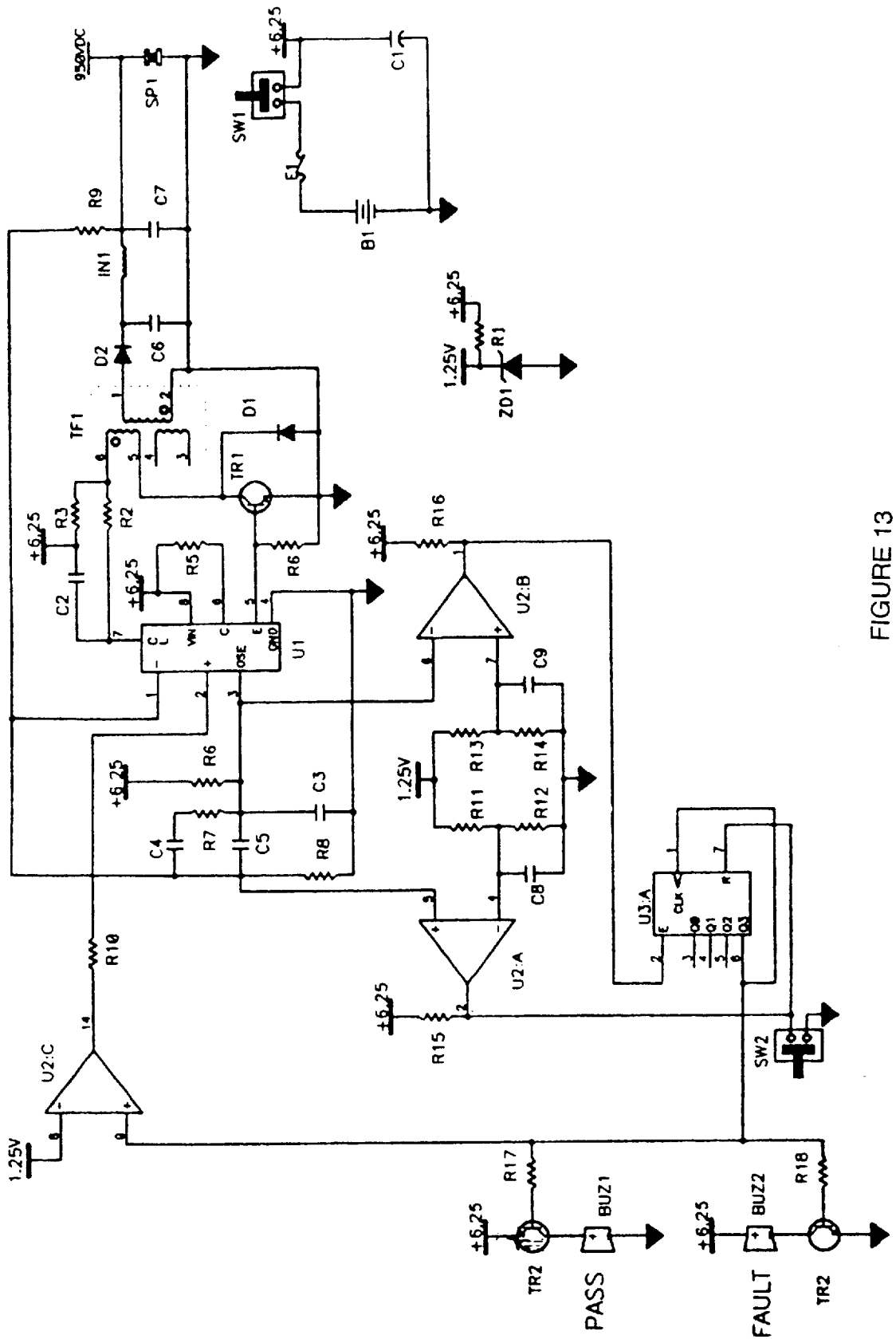
FIG. 13 is a circuit diagram for the apparatus of FIG. 12.

Referring to FIGS. 12 and 13, a pipe tester in accordance with the present invention, is shown generally at 200 in FIG. 12. The pipe tester comprises a housing 202 contained in a 1000 volt transformer 204. The transformer is connected an elongate snake 206 for extending into the interior of the pipe system. The snake is formed of any suitable material that provides sufficient axial stability to facilitate pushing of the snake through the pipe system without the snake bending upon itself. The outer casing 210 of the snake surrounds an electrical wire 212 that connects to the positive terminal of the transformer. The other end of the wire connects to a steel brush 214 as shown in FIG. 12. The steel brush has a plurality of steel bristles that are adapted to engage the inner circumference of the pipe sections. Preferably, the housing includes a winding mechanism and a storage cavity for winding the snake into the cavity for storage and transport.

When a sufficient current is conducted through the electrical wire, an electrical arc will occur whenever a pinhole or other flaw in the glass coating is located adjacent the steel brush. The electrical arc will trigger an alarm 216 located on the housing of the tester. This allows the operator to identify when the steel brush has located a flaw in the glass coating. By measuring the length of the snake that remains extended into the pipe system, the operator can determine the specific pipe section containing the flaw.

METHOD FOR TESTING PIPE SYSTEMS FOR FLAWS

To test for flaws in the pipe system, the following steps are preferably followed. First, the operator ensures that the pipe system is fully installed and that all electric wire connectors between studs are secured. The operator then checks continuity over the piping system by attaching one lead of a continuity tester to the studs located at the ends 26, 30 of the pipe system. If electric continuity is established, the operator then goes outside of the building and proceeds to feed the snake through the vent opening and into the pipe system. Once the steel brush has extended fully to the far end 26 of the pipe system, the operator engages the power to the transformer and begins slowly winding or otherwise drawing the snake back through the pipe system. If an alarm sounds, the tester determines the position of the steel brush within the pipe system to identify the position of the flaw. The operator then continues winding the snake and identifying the location of flaws in the system. Once the entire system has been tested, the operator disengages the power and proceeds to replace those pipe sections where flaws have been identified. A negative lead extends from the transformer for connection to the stud located on the last pipe section of the pipe system. The housing includes a handle 216 to facilitate carriage of the apparatus.

In addition, the pipe sections are factory tested upon manufacture at the plant using a similar high potential dielectric test method.

14

DETAILED DESCRIPTION OF SECOND PREFERRED EMBODIMENT

Figure 14:
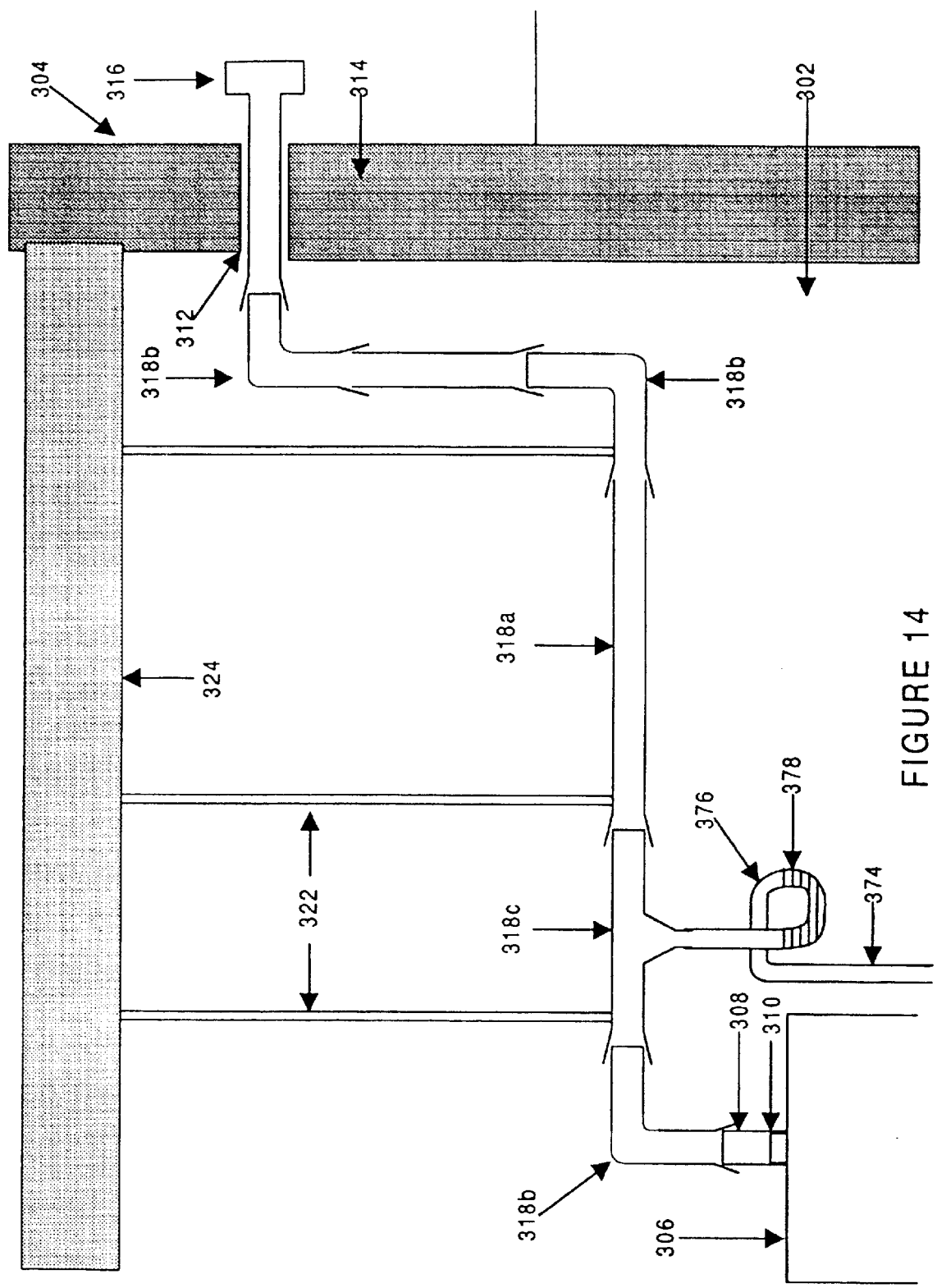
FIG. 14 is a sectional view of a basement of a building showing a second embodiment of a side wall vent piping system in accordance with the present invention.
Figure 15:
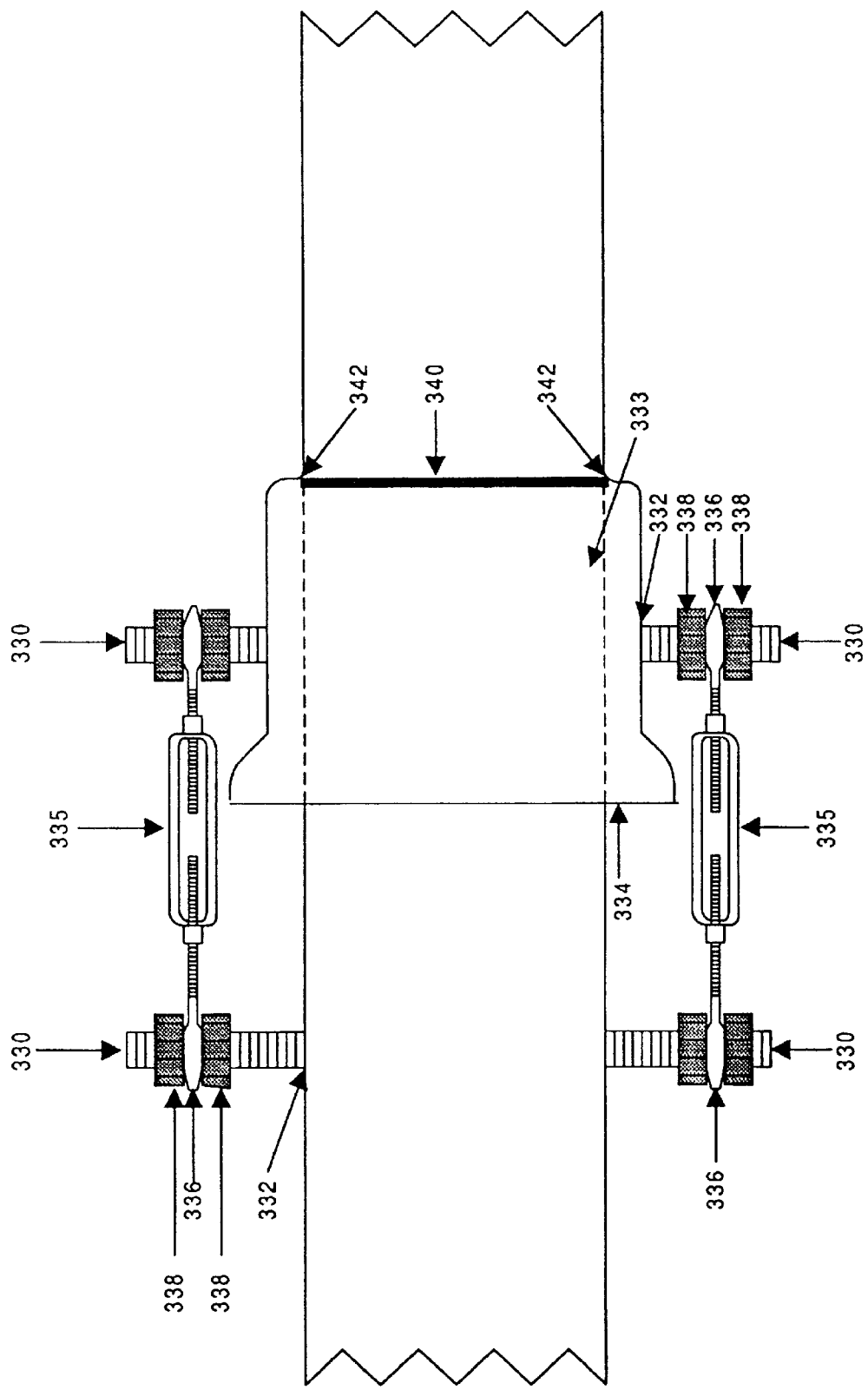
FIG. 15 is an enlarged side view of interconnected pipe sections for the vent pipe system of FIG. 14.
Figure 16:
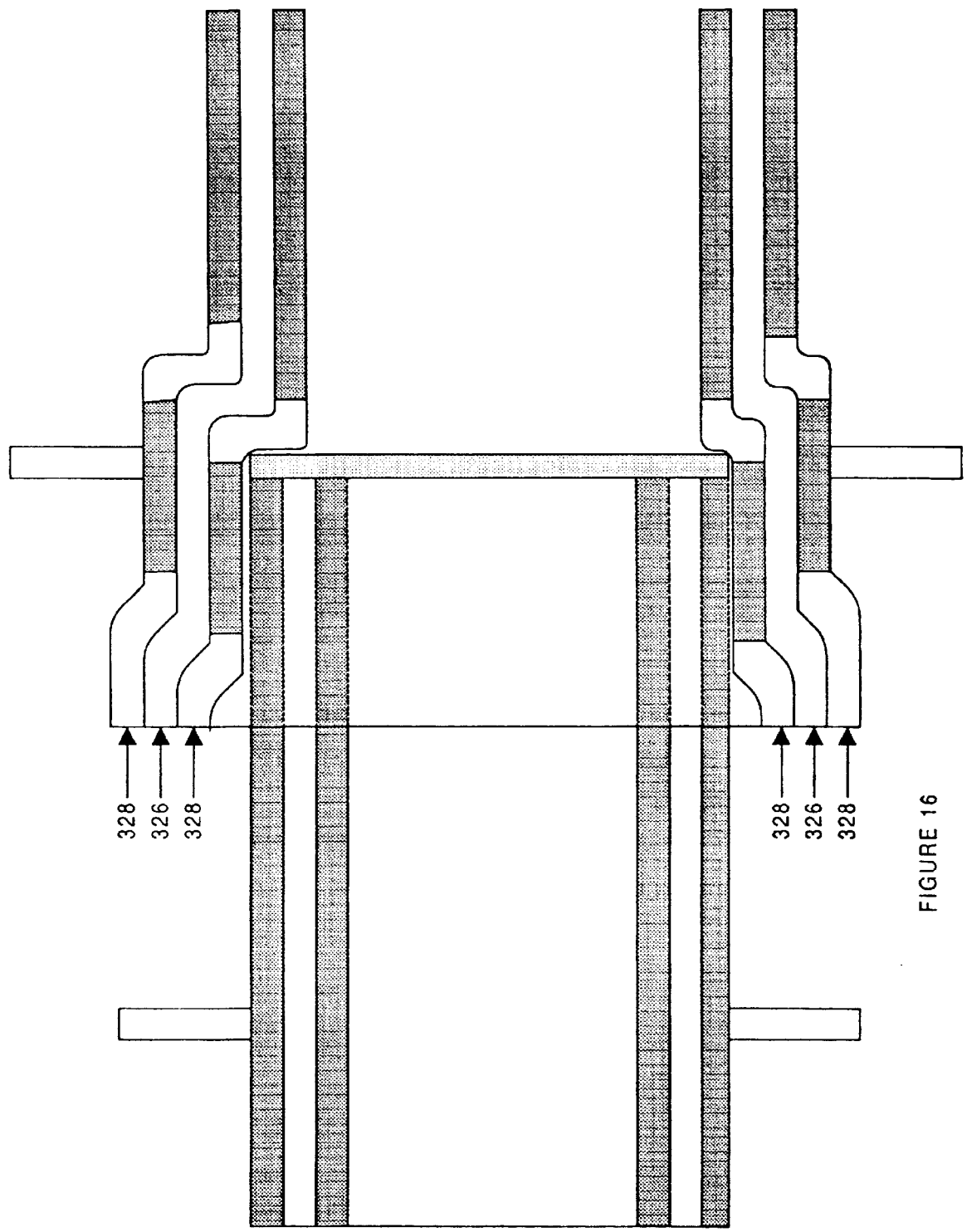
FIG. 16 is an enlarged elongate section of interconnected pipe sections for the vent pipe system of FIG. 14.

Referring to FIG. 14, a vent system in accordance of current invention is depicted generally at 300 as it would be installed in a basement or crawl space 302, of a building 304. The vent pipe system is connected to an appliance 306. The actual connection is accomplished with a transition piece made of 1100 aluminum 308 that is attached to the flue outlet of the appliance 310. The other end of the vent pipe system passes through a wall thimble 312 and exits the side of the wall 314 and ends in a termination piece 316 thus acting as a conduit to remove combustion gases produced by the appliance to the outdoors. The vent system includes numerous pipe sections 318 including straight sections 318a, elbow sections 318b, and a condensate tee 318c. Each pipe section has a male end with an outside diameter d' and a enlarged female end 320 having a inside diameter d'. The inside diameter d' of the female end is generally equal to, but slightly larger than the outside diameter d' of the male end to facilitate the snug end-to-end interconnection of adjacent pipe sections as shown in FIGS. 15 and 16. The female ends are located on the heating appliance end of the pipe section relative to the male ends for reasons that will be discussed more fully below. The pipe sections are supported from hanger straps 322 that loop around the pipe sections and connect to an upper support member such as the sub floor 324 of the building.

Referring to FIG. 16 each pipe section is comprised of a steel core 326 that has a glass coating 328 on its inner and outer surfaces. The glass coating is continuous and free of any pinholes or any other flaws in order to prevent corrosive materials such as concentrated acids from coming into contact with the steel core. The process for making the pipe and applying the glass coating is described in detail below.

Referring to FIG. 15, the end of each pipe section includes radial threaded studs 330 which are welded to the steel core and protrude outwardly from the outer surface of the pipe. The studs are rigidly connect by welds 332 or other suitable means to the steel core of the pipe sections. This provides an electrical connection to the steel core, the advantage of which will be described in detail below. As shown in FIG. 15 the male end 333 of the pipe section is inserted into the female section. Due to the nature of glass to build up on the end of the pipe, due to the dip coating process described previously it is preferred to have a bell configuration at the female end of the pipe 334 to allow the male end of the connecting section to penetrate the female section without interference from the inside diameter of the female section.

As shown in FIG. 15, a turnbuckle 335 is placed between the two sections of pipe which are to be joined. The eyes of the turnbuckle 336 are placed over the threaded studs and held securely by threaded nuts 338. By turning the turnbuckle in the proper direction the sections of pipe are drawn together, compressing a VITON™ gasket 340 attached to the male end of the pipe against the inside shoulder 342 of the female end of the pipe to form an airtight seal. When being used as a pressurized pipe system for conduction of pressurized corrosive liquids or gases an additional Viton™ based coating named FLOUROPAST™ will be applied over the Viton™ gasket 340 as well as the end of the pipe to form a continuous protective barrier which will be detailed later.

Figure 17:
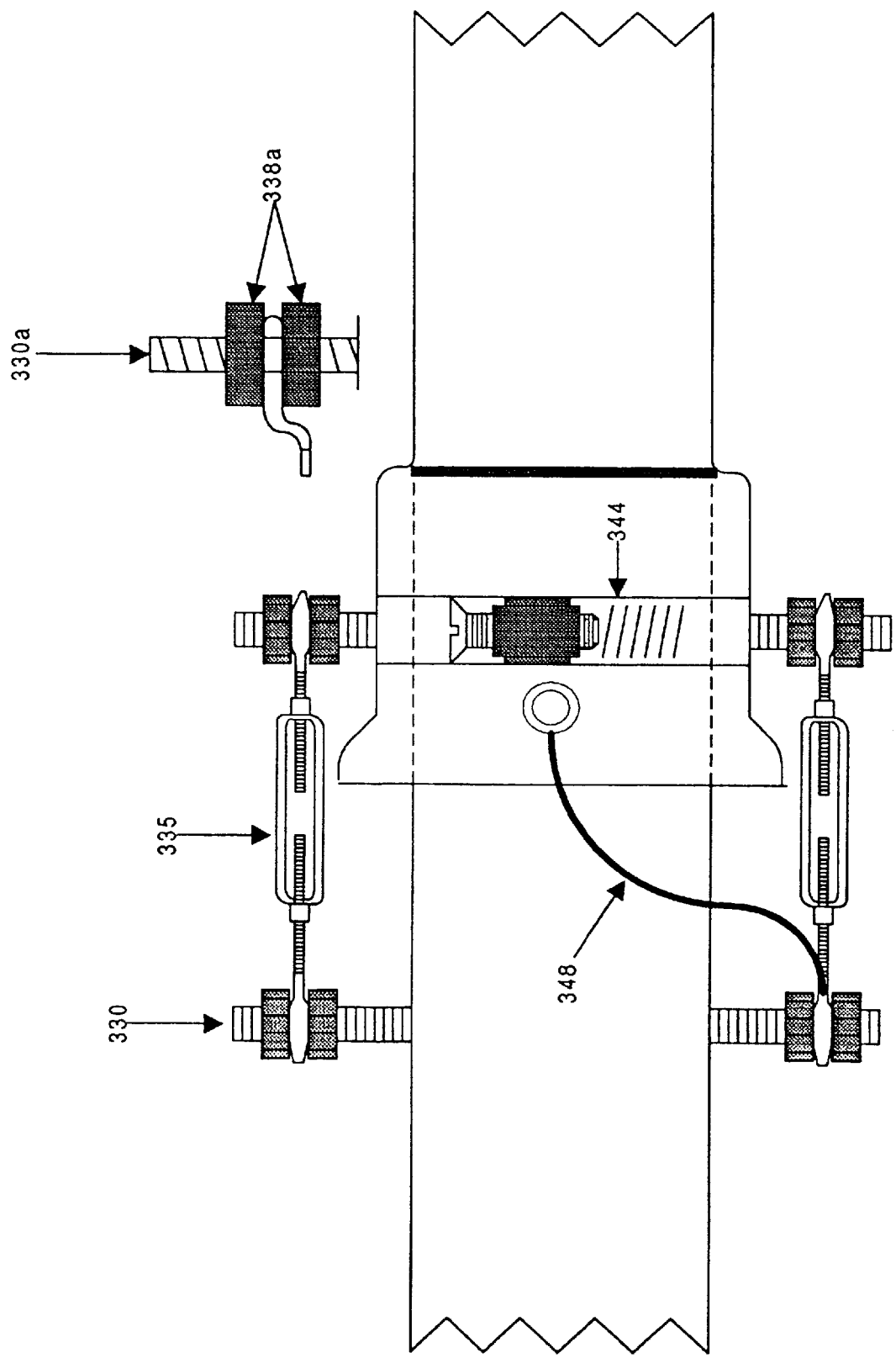
FIG. 17 is an enlarged side view of interconnected pipe sections for the vent pipe system of FIG. 14.

Referring to FIG. 17, in many cases the threaded studs which have been welded to either side of the ends of the pipe sections will not align properly to the studs of the adjoining section if an elbow section has been rotated. to achieve certain configurations. Under these conditions, a provision for connecting the turnbuckle 335 to an adjoining section of pipe is achieved by the use of studded gear clamp 344 (refer to FIG. 18). The studded gear clamp has two radial threaded studs 346 which protrude outwardly from the center of the gear clamp. The gear clamp is placed around the one end of the pipe section to be joined, lined up with welded studs on adjoining pipe section and tightened securely. The gear clamp is placed on the opposite side of the welded stud 330*a* so that the gear clamp cannot slip towards the center of the joint when the turnbuckle is tightened. The studded gear clamp will allow 360 rotation of any elbow so that the threaded studs of the gear clamp 346 can line up properly with the threaded stud which is weld onto the steel substrate of the adjoining pipe section. By turning the turnbuckle in the proper direction the sections of pipe are drawn together, compressing the Viton( gasket 340 attached to the male end of the pipe against the inside shoulder 342 of the female end of the pipe to form an airtight seal.

Since the studded gear clamp is resting primarily upon the glass coating of the vent pipe, there is no assurance of electrical continuity, the importance of which will be discussed later. To ensure electrical continuity between the metallic substrates of each adjoining section of pipe, a provision is made for a jumper wire 348 to be connected between the welded stud 330 connected to a welded stud of the adjoining sections of pipe. The jumper consists of a short piece of insulated wire 348 which is connected to a soderless ring crimp connector 350. The soderless ring connector is held secure by the threaded nuts 338*a* used in securing the turnbuckle to the welded studs. Alternatively the jumper wire can be connected between the studs on the gear clamp and a welded stud on the same section of pipe that the studded gear clamp is secured to, in this way the turnbuckle 335 which is secured to the welded stud of the adjoining section of pipe will complete the electrical continuity between the metal substrates of both sections of pipe.

Figure 18:
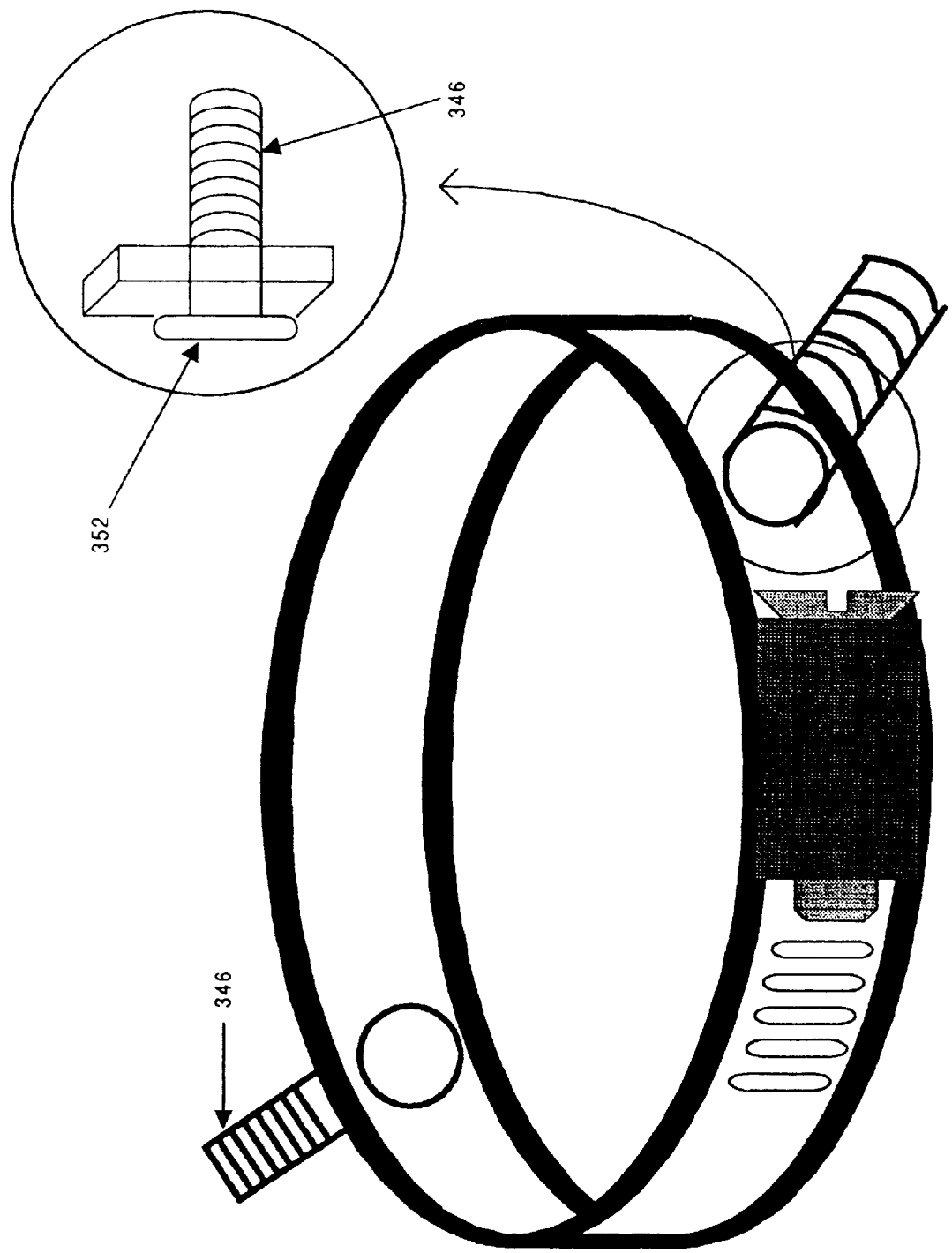
FIG. 18 is a perspective view of a studded gear clamp in accordance with the present invention.
Figure 19:
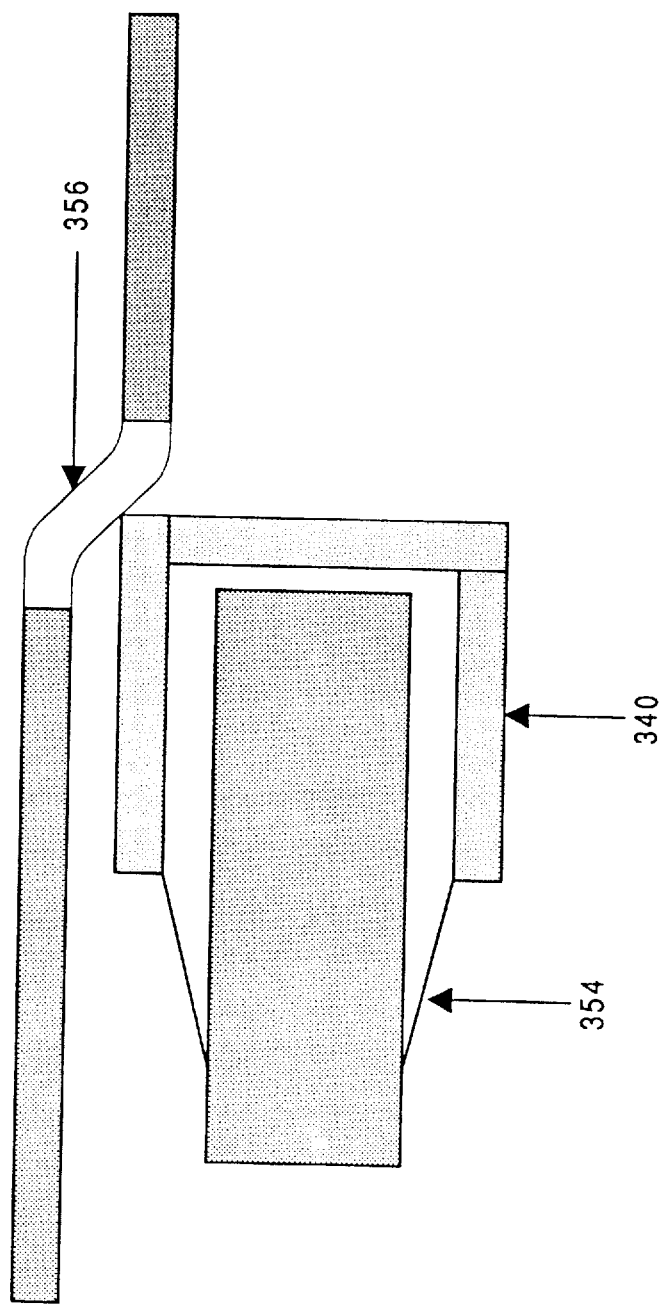
FIG. 19 is an enlarged sectional view of the interconnected pipe sections for the vent pipe system of FIG. 14.

Referring to FIG. 18, the studded gear clamp is produced by inserting a ¾ inch stud 346 through a ¼ inch hole in a conventional gear clamp. The base of the stud 352 is larger than the body of the stud, thus preventing the stud from passing through the hole in the gear clamp. When the gear clamp is tightened the studs are opposite each other and may be lined up with the studs welded to the steel substrate of the adjoining pipe. The studs are held upright and secure by the pressure asserted when the gear clamp is tightened after lining up with the studs on the adjoining pipe.

In a mid efficiency heating system as depicted in FIG. 14, acidic corrosive condensate will develop inside of the vent system as the flue products of combustion cool. This acidic condensate can become highly corrosive which is the reason the main body of the venting system is glass coated to provide corrosion resistance. Glass however has dificulty giving a uniform coating to sharp edges of a steel pipe such as that found on the male end of a pipe section. A high temperature resistant and acid resistant material must be used to protect the male end of the pipe sections. Ideally the material protecting the male end face of the pipe will also offer a cushioning feature to help avoid stress where the two glass surfaces will meet.

The preferred protective material is a fluorelastomere sold by DuPont under the trade mark VITON. A gasket ring 341 having a generally U-shaped cross-section is fitted over the male end face of the pipe section. The gasket ring is formed from the VITON™ material 340 and has closed cell air bubbles that increase the cushioning ability of the gasket. The gasket ring is adhered to the pipe section using a VITON™ caulking 354. The VITON™ caulking is cut with methylethylketone (MEK). The VITON™ caulking is spread on the male end faces of the pipe sections and extends approximately ¼ inch on both the interior and exterior surfaces of the pipe adjacent to the end face. The VITON™ ring gasket is then placed over the caulking and the male ends of the pipe. The excess caulking is then smoothed along the end of the VITON™ gasket and the glass coated pipe. When the MEK evaporates, the VITON™ caulk cures and forms a bond with both the glass coated pipe and the VITON™ ring. Alternatively, a water based VITON™ caulking and coating material trademark FLUROPLAST can be used. FLUROPLAST™ is ideal to use if the pipe system is being utilized for high pressure applications of corrosive liquids or gas because it has the ability to form a protective barrier over both the VITON™ gasket as well as the end of the pipe which will minimize the risk of corrosive liquids or gas being forced underneath the U-channel and reaching an exposed end of the steel substrate. Other synthetic elastomers such as ethylene-propylene, chloroprene, nitrile, or perflouro elastomers may be used.

It is important to note that the pipe sections are oriented with the male ends facing upstream relative to the condensate flow. This ensures that the closed end of the gasket ring meets the condensate flow. That minimizes the likelihood of condensate penetrating the gasket ring to corrode the steel core.

In order to allow interconnection, the female end of each pipe section is slightly tapered outwardly to provide extra clearance for receiving the VITON™ gasket fitted to the male end face of the corresponding pipe section. The male end travels a distance of approximately 3 inches inside the expanded female end of each pipe section (refer to FIG. 15). The female end has an internal shoulder 356 having a depth of approximately ⅛ inch. The VITON™ gasket is adapted to abut against the shoulder to offer a pressure type seal. The shoulder has a smooth radius to facilitate an adequate glass coating as described further below. In this manner, there are no surfaces on the interior of the pipe other than glass and the VITON™ gasket or coating which can come into contact with flue gas, acidic condensate or corrosive liquids. The edge of the female receptacle section is the only potentially exposed area but this section is isolated from the interior of the pipe system by the glass coated radius and the VITON™ seal. This will protect the interior of the vent pipe system and allow the corrosive condensate to freely flow towards the appliance.

Figure 20:
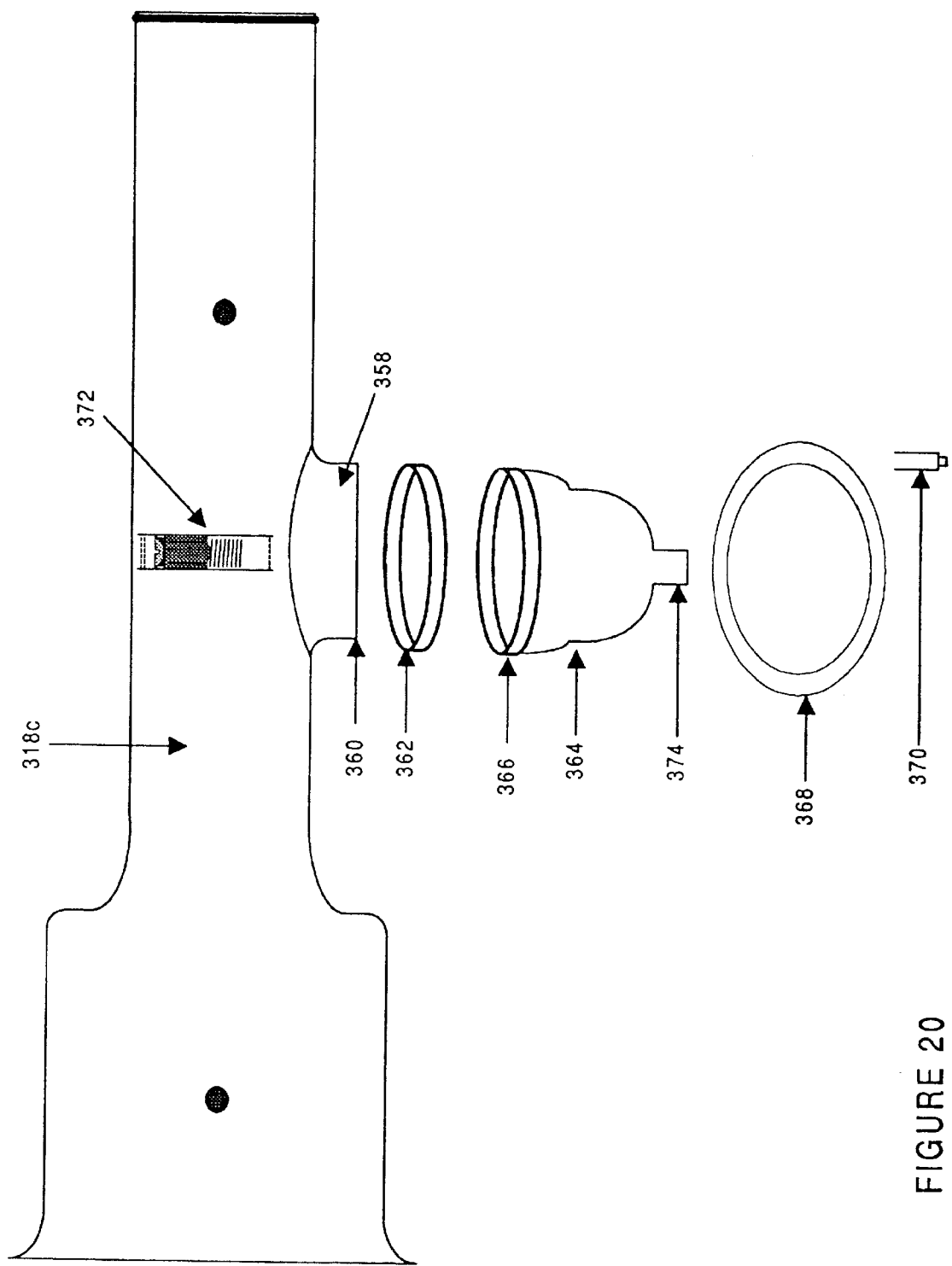
FIG. 20 is an exploded side view of a condensate tee section of the pipe system of FIG. 14.

It is known that all sections of the vent pipe system slope a minimum of ¼ inch per foot towards the heating appliance. The appliance is at the low point of the slope and the side wall exit is the high point of the slope. A condensate drain tee 318*c* must be located as close to the appliance as possible. The purpose of the condensate tee is to remove the corrosive condensate and prevent it from entering the appliance Referring to FIG. 20, the condensate tee includes the male and female ends as well as a tee flange 358. The tee flange protrudes outwardly from the outer surface of the pipe section with a 90° radius at the base of the flange. The flange is preferably located at the center of the condensate tee section. The sharp edge of the tee flange 360 will be difficult for the glass to consistently coat. Additional protection against corrosion must be provided by means of a VITON™ gasket 362, having a U shaped cross section, designed for and manufactured to fit securely over the condensate flange. The VITON™ ring is seccured to the flange with VITON™ caulking in a similar process as described earlier. It is important that the caulking be spread generously above the open edge of the U-channel for the gasket 362 to ensure that condensate does not drain down between the U-shaped channel and the glass and work its way to the edge of the tee flange. A condensate tee reducing nipple 364 which has a protruding lip 366 is designed to fit over the tee flange gasket in such a way that it cannot slide sideways when secured in place. The condensate reducer includes a clamp washer 368 that is used to draw the reducer upwardly into secure engagement with the tee flange. The washer has two ends of a gear clamp secured by a pop rivet 370 which can then be drawn up to the body of the condensate tee by a condensate tee gear clamp 372. When the gear clamp is tightened the condensate reducer is securely held against the U-shaped VITON™ gasket and will be liquid and gas tight. The small end of the condensate reducer has a sharp metal edge that will be difficult to coat with glass. For this reason a coating of FLUROPLAST™ or VITON™ Caulking is applied to protect against any exposure to condensate. A plastic drain hose 374 (refer to FIG. 14) hose is then connected to the end of the condensate reducer and will drain any liquid into the floor drain rather that the applaince. The hose includes a looped portion 376 that is filled with water 378 to prevent the escape of flue gas through the hose. The condensate will flow down into the loop and force a corresponding amount of water out of the other end of the loop into the drain.

MANUFACTURING OF STEEL CORE

The steel core is formed from a sheet (not shown) of 16 gauge ASTM 424 Type 1 vitreous enamelling steel which is roll formed into a hollow cylindrical tube having a preferred outside diameter of 3 or 4 inches. The steel is a specially developed from low carbon steel for ceramic coating applications. As will be described further below, the glass coating is applied to the steel core by a dipping process and then heated to high temperatures to bake the coating onto the pipe. It has been found that pitting or bubbling occurs with glass coatings that are applied to high carbon steel. This is because the heat turns the carbon into a gas which blows out through the glass coating during baking. Low carbon steel reduces the likelihood of this happening. The glass coating, which is water based, also contains soluble hydrogen which becomes trapped in the voids left by the carbon. The preferred steel formulation absorbs the hydrogen gas as both materials cool to prevent the coating from forming bubbles and pitting.

The steel sheets are fed in known manner through a series of rolling dies (not shown) to form the tube shape and then are welded together with high frequency electrical resistance welding (ERW). While the weld is still soft due to the high temperature of the welding process, the welding flash on both the inside and outside of the steel core is eliminated. This is accomplished by either cutting the excess weld using a hardened cutting tool on both of the inside and outside tube (this process is known as flash removal) or using a set of rollers positioned in the same location on the interior and exterior of the tube and applying enough pressure to force the sharp irregular shaped welding ridge back into the tube to form a perfectly smooth surface (this process is known as flash rolling). It is important that the weld be removed because the subsequently applied glass coating will not coat the sharp spiked ridge of a weld flash without leaving a series of pinholes.

Once the steel core is formed, it is cut to the desired lengths for installation into a finished pipe system. After cutting, the ends of the steel core are deburred and smoothed in known manner to facilitate application of the glass coating.

Prior to applying the glass coating, the radial studs are welded to the outer surface of the steel core for each pipe section. In welding the studs to the steel core, the temperature of the weld should be carefully controlled. To control the temperature of the weld when attaching the radial stud, a high frequency compacitor discharge stud welding process is used. If the temperature of the weld is too high, the oil used in rolling and milling the steel will be burned into the steel surface on the opposite side (interior side) of the tube. The oil contains carbon which could become imbedded in the steel if the temperature is too high. The carbon cannot then be removed during a subsequent cleaning process which is necessary to prepare the steel tube for glass coating. If the surface of the steel contains the carbon from the oil, this carbon becomes gaseous and will migrate outwardly from the steel core during the firing process for the glass coating. This will leave a pitted area where the carbon gas has displaced the molten glass as it moved outwardly from the steel core.

Prior to applying the glass coating, the elbow sections of the pipe are formed. This is accomplished in known manner by utilizing an interior mandrel (not shown) to prevent the interior of the tube from collapsing and restricting the flow rate within the bent area. The mandrel (a ball-shaped tool) remains in the interior of the steel core while a hydraulic arm (not shown) bends the steel tube to a desired angle (e.g. 90°). The mandrel is then withdrawn from the tube leaving the inside diameter of the tube consistent throughout the bend.

The male and female ends of each pipe section are also formed prior to applying the glass coating. The female end has an expanded portion that preferably extends for approximately a 3 inch length of the steel core. The expansion portion of the female end begins at nominal diameter plus 195 thousandths of an inch and tapers outward to the end of the tube which is 210 thousandths of an inch larger than nominal diameter. As previously explained the very end of the expansion is flared out in a bell shape 334, which is accomplished by a sharp outward flare 381 of the male steel forming core. This is to ensure that the normal build up of glass coating on the end of the pipe will not impede the male end of the pipe with the VITON™ ring from freely entering the female end during installation. As shown in FIG. 21, the female end is formed by forcing a tapered tool 380 inside the end of the steel core to force the steel to expand outwards. When applying proper lubricants to the steel core, the core will expand the proper shape during the expanding process without the aid of an exterior mold to form the metal. The forming steel core is propelled by a hydraulic cylinder 382. The pipe which is to be expanded is held in place by placing the pipe against the stationary pipe clamping die 384 and having the mirrored hydraulic clamping die 386 move across propelled by hydraulic cylinder 388 firmly holding the pipe secure. Once the pipe which is to be expanded is securely in place between the semi circular clamping dies the forming steel core 380 moves forward powered by hydraulic cylinder 382 expanding the pipe. The forming steel core enters the pipe to be expanded with a radius smaller than the pipe to be expanded to allow for a smooth and easy entry. As the forming steel core proceeds the taper on the forming steel core increases to provide the necessary expansion. When the forming steel core reaches its maximum radius it expands the pipe to include the bell shape flare. After expanding the forming core is withdrawn and the securing hydraulic clamping die is withdrawn and the pipe is released. Alternatively,. expansion of the female end can be accomplished by a set of expanding fingers (not shown) powered by a hydraulic press which forces a tapered rod into the center of a set of fingers forcing the fingers to expand.

It is also necessary to form the condensate tee prior to applying the glass coating. A conventional welded pipe tee is not acceptable because the glass coating will not fully cover the welds or sharp edges. Accordingly, the condensate tee is fabricated by drawing the a cylindrical steel core outwardly from the inside of the pipe to form a 2 inch round tee flange.

The steel is drawn out by first punching an oblong hole (preferably ⅞ inch by 1.5 inches) that is oriented with its long dimension extending along the length of the steel core. If the hole is not oblong, it has been found that the steel core will split when drawn out of the side of the tube. This is accomplished by employing a punch press to punch out the hole in the pipe as required.

Figure 22A:
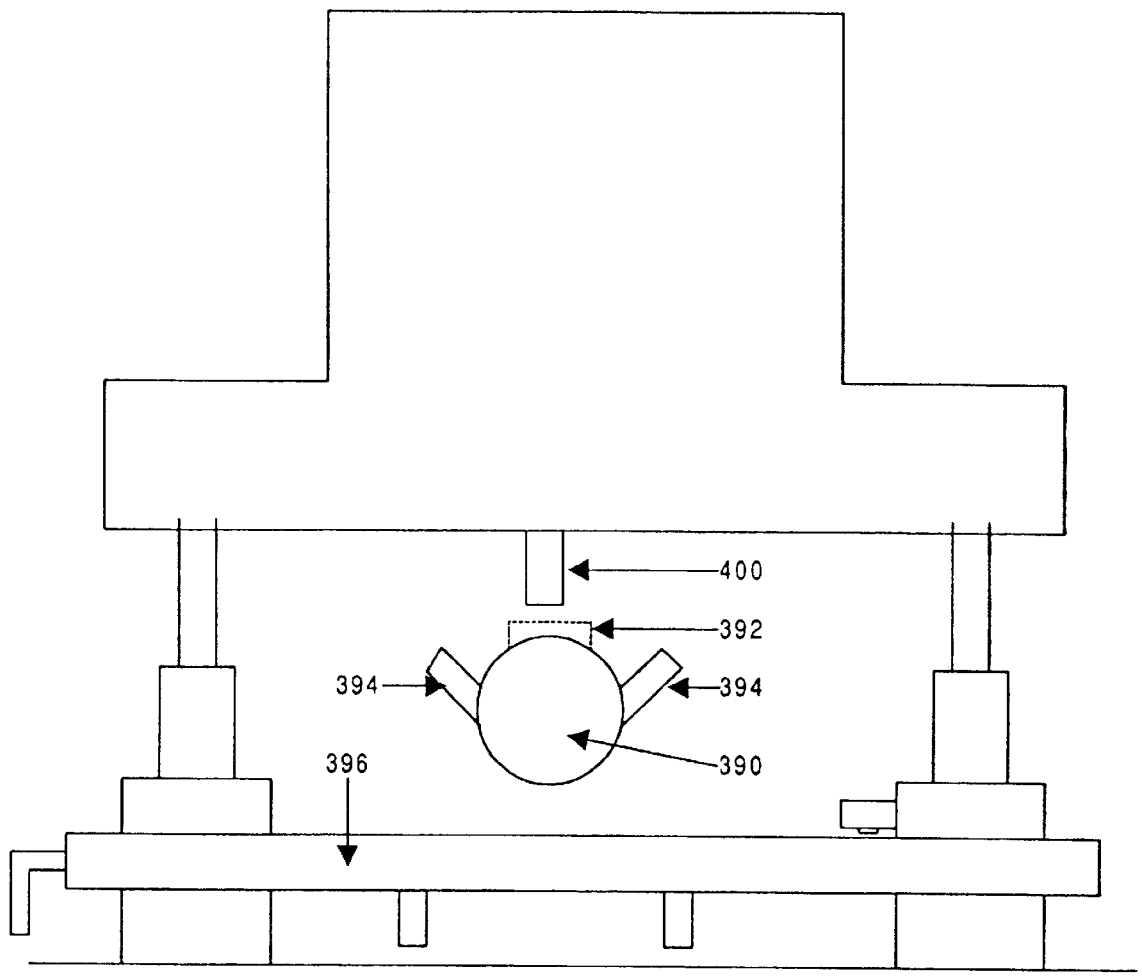
FIG. 22a is a front view of a punch press for forming the condensate tee in accordance with the present invention.
Figure 22B:
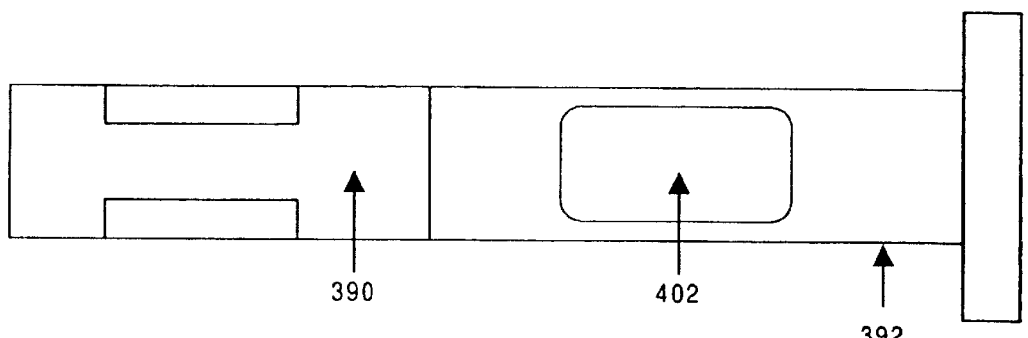
Figure 23A:
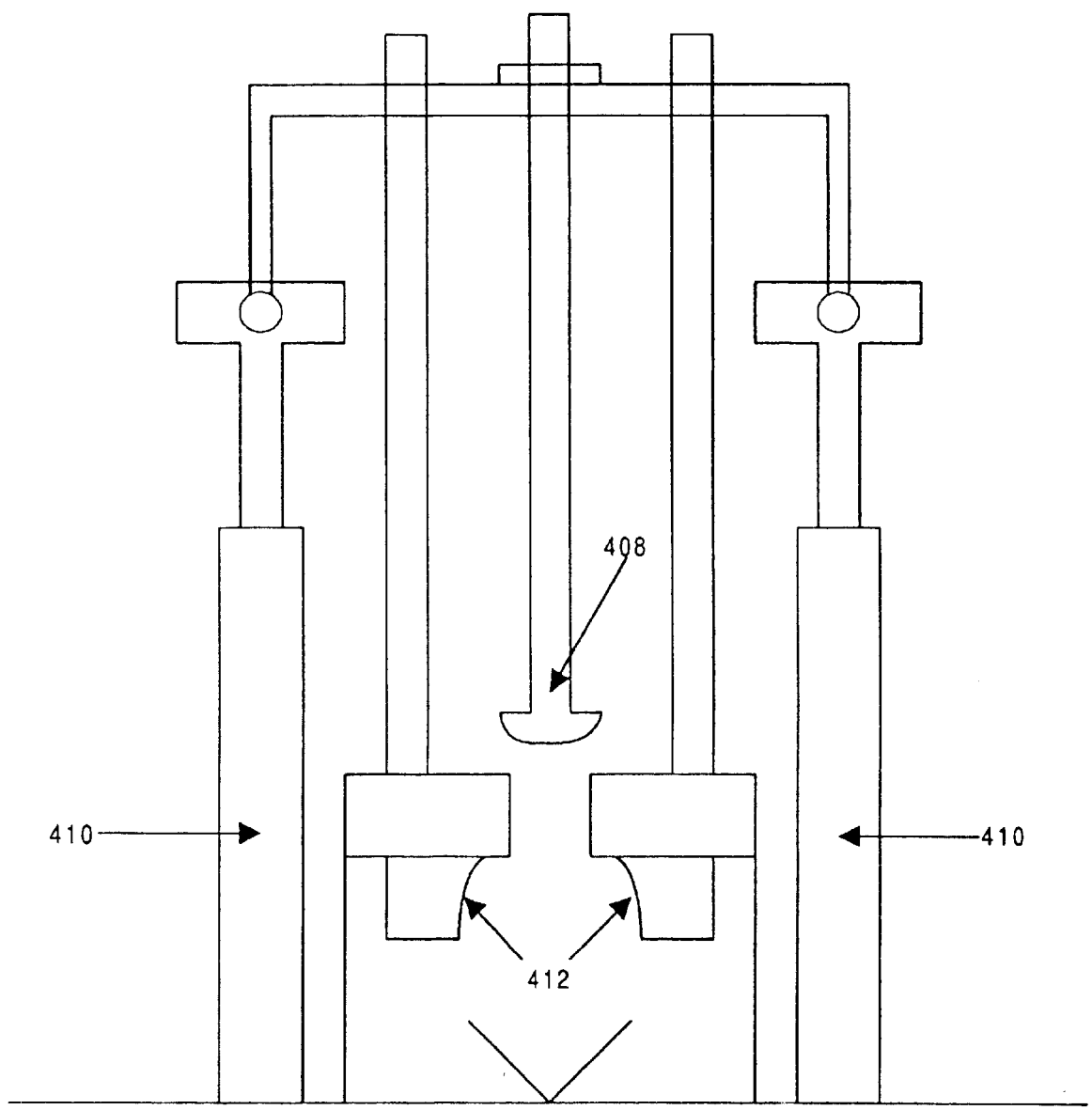
FIG. 23a is a front view of a tee puller device for forming a condensate tee in accordance with the present invention.
Figure 23B:
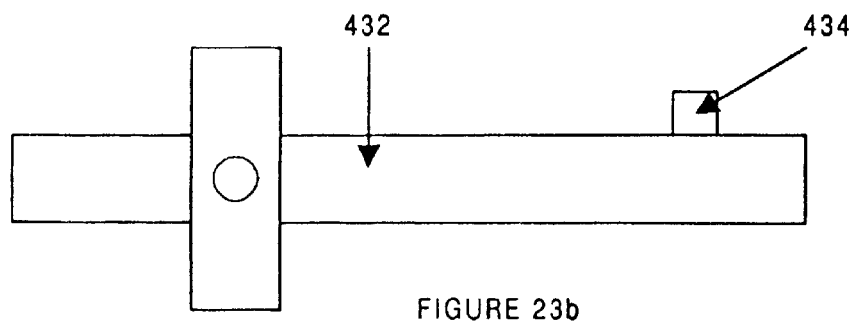
Figure 23C:
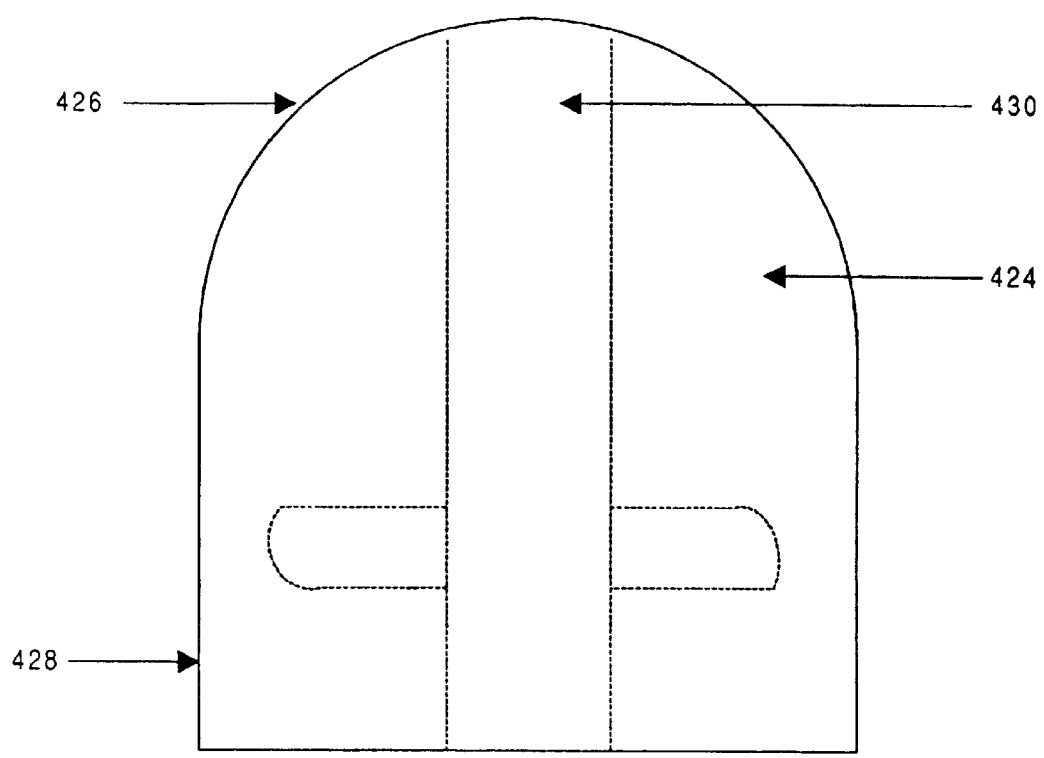
Figures 23D, 23E:
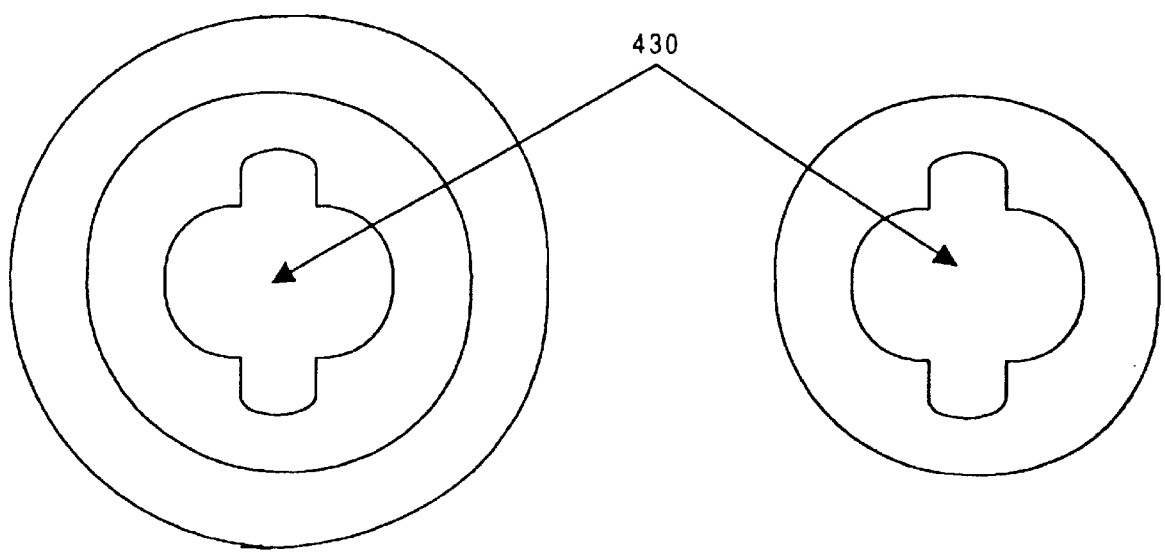
FIG. 23d is a bottom view of the male plug of FIG. 23c.
FIG. 23e is a top view of the male plug of FIG. 23c.

Referring to FIG. 22 the male punch die has ⅞ inch by 1.5 inch oblong face 400. The 1.5 inch section of the punch die runs parallel with the length of the tube. The ⅞ inch section of the punch runs across the width of the tube. The female receptacle for the punch die 402 is the same dimension plus 0.005 inches added clearance to allow the male portion to enter the female and sheer the steel of the tube when the punch press cylinder comes down. To punch press the oblong hole a piece of pipe is placed over the guide pipe with die 390 until it comes to rest against the rubber back stop 392, while resting against the horizontal guide tabs 394 ensuring the proper and consistent placement of the oblong hole. The front support bar 396 is lifted by rotating the handle counter clockwise causing the bar to rotate upwards thus supporting the front of the pipe and ensuring that it is perfectly level and stable prior to punching. The front guide tabs 398 ensure the pipe cannot shift forward during the punching process once the front support bar is fully forward and locked in place. The pipe is now ready to be punched whereby the cutting die 400 moves in a downward motion, penetrating through the pipe and fitting into the die 402 secured to the guide pipe with die. After penetrating through the steel, the punch returns to its previous position. The pipe may be released by rotating the front support bar clockwise and removing the pipe from the guide pipe with die.

Referring to FIG. 23 the steel is drawn out to form the condensate tee flange by employing the condensate tee puller 404. A 1 foot piece of pipe which had previously been punched with an oblong hole is placed on the V pipe guide 406 with the oblong hole facing up directly below the tee puller locking key with rod extension 408. The hydraulic cylinders 410 force the locking key with rod extension downwards towards the pipe to be extruded.

Figure 24:
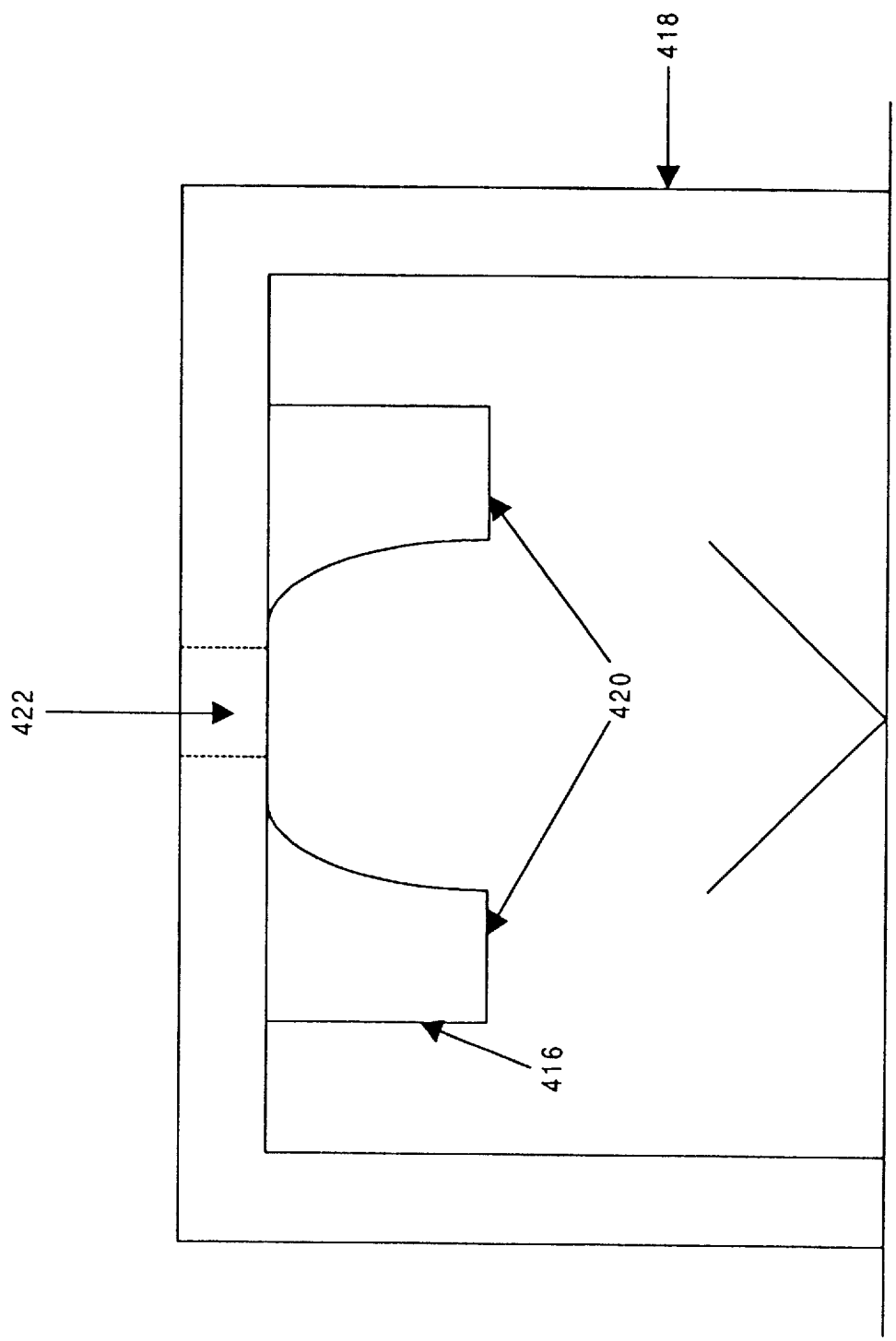
FIG. 24 is a front view of the female receptacle for forming the condensate tee in accordance with the present invention.

To prevent the steel from pulling out of the side of the tube uncontrollably, a female receptacle 412 is employed as shown in FIG. 24. The female receptacle is comprised of hardened tool steel. The receptacle has a central hole 414 which allows sufficient clearance to draw the male plug through the side of the tube and form the steel flange out of the side of the tube. One end 416 of the female receptacle is cut at a 90° angle and fastened to the guide support box 418. The other end 420 is machined to match the radius of the steel tube from which the tee flange is to be drawn outwardly from. The outside of the steel tube can then rest securely on the female die from which the tee will be drawn out.

At the interior point of the female receptacle where the interior hole meets the surface of the exterior of the tube, the sharp 90° angle of the female receptacle 422 must be rounded to allow the metal being drawn out of the side of the tube to form a smooth radius. This smooth radius is critical for suitable glass bonding.

As shown in FIG. 23, a male plug 424 with a rounded top 426 and tapered sides 428 is pulled from the inside of the steel tube until it is completely out of the tube. The plug has a locking key tapped hole 430 through the entire male die. The die is pulled through the steel tube by the locking key with rod extension 408.

To insert the locking key with rod extension into the male plug the insert cross 432 is used. The bottom of the male die is placed on the long end of insert cross while placing the locking tab 434 on the insert cross into the die cut on the male plug to prevent it from turning. The male plug on the insert cross is inserted into the pipe by lining the locking hole in the male plug with the punched hole in the pipe. The locking key with rod extension is turned so that it will slide into the male plug without interference. The locking key with rod extension is slowly lowered until it contacts the insert cross. The locking key with rod extension is turned to lock the male plug onto the locking key. The locking key with rod extension is slowly raised until the steel pipe fits squarely and securely into the female die 412 and the insert cross is withdrawn. Once secure and square the hydraulic cylinders moves the locking key with extension rod upwards drawing the male plug through the steel tube creating the condensate flange. As the plug enters the female receptacle, the steel of the tube is drawn into the clearance space between the plug and the interior of the female receptacle. This forms the metal into a 2 inch tee drawn out of the side of the tube with a smooth rounded radius at the base of the flange which the glass coating can easily bond to. The flange preferably extends ¼ to ½ inch out past the side of the tube. Any irregularities of the end edges of the drawn tee can be belt sanded to give a flush surface to the end of the 2 inch extrusion if necessary. The support guides 436 ensure that the locking key with extension rod moves upward staying level and perpendicular to ensure a consistent flange.

The condensate tee reducer must also be formed prior to the application of the glass coating. Since the glass coating does not coat properly on sharp edges, the reducer must gradually reduce from the 2 inch opening to the ½ inch reduced opening. This is accomplished by spinning an ASTM 424 type 18 or 20 gauge steel disk into the proper shape. The steel is placed onto a spinning lathe between the lathes' tail stock and the spinning die. The disk is then spun at approximately 1,500 rpm. and formed or pressed against the spinning die. As the disk is pressed against the die, it assumes the contour of the die.

The top of the reducer is 2.4 inches long. This allows 0.2 inches clearance around the condensate tee flange. This clearance area accommodates a fluoroelastomeric U-shaped VITON™ ring gasket. The reducer needs a lip to securely fit into the condensate tee flange. This vertical lip wall comes down from the top of the reducer 4.4 inches. This lip wall tapers from 2.5 inches from the top of the lip to 2.3 inches at the bottom of the vertical wall of the lip. Over the distance of the next 0.1 inch, the reducer quickly reduces horizontally to a diameter of 2 inches. This completes the portion of the reducer forming the lip. This lip can now fit securely up against the condensate tee flange.

GLASS COATING PROCESS

The process for applying the glass coating to the steel core comprises the following broad steps:

(1) porcelain enamel formulation;

(2) preparation of slip (liquid enamel);

(3) pre-treatment of steel cores (cleaning);

(4) dipping of cores in slip;

(5) firing dipped cores; and (6) periodically testing completed product.

Each of these process steps are described in more detail below.

1. Enamel Formulation

The glass coating comprises a porcelain enamel formulation that is developed using empirical methods to achieve appropriate levels of primary and refire bonds, acid resistance, coating continuity, Theological stability, and slip aging characteristics. In the preferred embodiment, the porcelain enamel formulation is as follows:

| Ingredient | Amount |
|---|---|
| XG-639 | 270 lbs. |
| XF-127 | 30 lbs. |
| Red Label Clay | 15 lbs. |
| T Clay | 6 lbs. 12 oz. |
| Bentonite | 9 oz. |
| Decahydrate Borax | 1 lb. 8 oz. |
| Magnesium Carbonate | 12 oz. |
| Potassium Carbonate | 9 oz. |
| "Setithr" | 3 oz. |
| Potassium Nitrate | 6 oz. |
| Kelzan | 64 g |
| FCP-25 | 2 lbs. 4 oz. |
| Water | 18.6 gal. |

2. Preparation of Slip

Once the formulation is determined, the ingredients are loaded into a ball mill and rolled until the desired particle size is obtained. The fineness of the particle size is determined by wet washing a 50 cc sample through a 200 mesh sieve and volumetrically measuring the amount retained on the sieve. The target amount is 7 g plus or minus 1 g retained.

Once the slip is milled to the correct fineness, the mill is strained through a 40 mesh sieve into a polyethylene holding tank. The slip is then pumped using a diaphragm pump onto a vibratory sieve and must pass a 60 mesh screen. This material then gravity feeds past two bar-grate magnets to separate out any fine iron particles. This slip is then gravity fed into a clean polyethylene storage tank. It should be noted that great care must be taken to ensure the enamel slip is not contaminated by any other material especially any organic compounds as this will cause surface defects resulting in coating failure.

The processed enamel slip must then be adjusted to the appropriate specific gravity and viscosity. Gravity is measured by weighing 100 cc of slip and dividing the weight by 100. Viscosity is measured by an empirical test when a 12 inch by 12 inch plate is dipped into the enamel and its "picked up" weight is measured. The target specific gravity is 172 g per cc plus or minus 1 and the target pickup weight is 94 g per square foot plus or minus 3.

If the enamel is not at the target's specific gravity or viscosity, it must be adjusted to ensure workable rheological properties in the dipping process. If the specific gravity is too high, water is added to lower it. If it is too low, the enamel must be left to stand for a period of time until clear water has risen to the top. This clear water is then decanted leaving a higher gravity slip. If the pickup is too low, it is increased by carefully adding a dilute solution of sodium nitrate. If the pickup is too high, it can be lowered by slowly adding a dilute solution of tetrasodiumpyro phosphate.

The enamel slip is stored at or below 70° F. in a covered polyethylene tank to prevent accelerated thermal aging during the summer months. Covering the enamel aids in preventing contamination of the slip.

3. Treatment of Steel Cores

Raw steel cores must be cleaned prior to coating to remove soils that would cause surface defects that would result in coating failures. The specific soils to remove include general shop dirt that adheres to the oily core surface, metal filings resulting from core cutting and hole drawing processes, mineral oil rust preventive solution on the surface of the steel sheet at the steel mill (prior to steel core formation), rolling lubricants left on the steel during the fabrication of the steel core, loose carbonized mill oils present at the weld seam burned into the steel during the seam welding of the tube, and mineral oil or chlorinated paraffin or other like materials used during the heavy drawing processes during the bonding of elbows and expansion of tubing ends.

Prior to dipping, the steel cores must be cleaned as follows. Various lengths of cores are loaded into a cage fabricated from ½ inch by 30 inch stainless steel in such a way as to allow a free emersion of all core surfaces and not to entrap air in elbows or the like. The cage is lifted using an overhead crane and dipped into a first cleaner tank. After the appropriate time, the cage is transferred to a second cleaner tank or a polishing tank. After the appropriate time, the basket is removed from the polishing tank and transferred to the hot rinse tank. During the summer months, a fourth emersion may be necessary in a weak amino solution to prevent rusting of the cores in process.

The first cleaner tank is charged with 8 oz. per gallon of KIM CLEAN 552 VITON™, a unsilicated sodium hydroxide cleaner. The bath operating temperature is maintained between 160°–180° F. and the emersion time is set at 20 minutes. The second cleaner tank or polishing tank is charged with 8 oz. per gallon of VANCAM 38™ which is a similar unsilicated sodium hydroxide based cleaner but with the addition of 10 liters of VANCAM 25™ a co-solvent to promote solution stripping prior to rinse. The bath temperature is maintained between 160°–180° F. and the emersion time is set at 20 minutes. The hot rinse tank has no additions and is maintained between 130°–150° F. with an emersion time of 10 minutes. If required, the rust inhibiting bath is made up with a ¼ oz. per gallon of ATO KIM SF 915™ which is an amide solution. The bath temperature is maintained at between 160°–180° F. and the emersion time is 10 seconds. All emersion tanks are filled using tap water that is otherwise untreated with a 190 grain hardness. Compressed air is discharged into the bottom of all of the tanks to promote agitation of the solutions.

The presence of any organic contaminate on the surface of the steel cores will cause a surface defect that will result in a flaw in the glass coating. The following test has been developed and is applied to tubes after the hot rinse stage of pretreatment. The test should be conducted prior to the rust inhibitor emersion since the amide film tends to produce erroneous test results. In other words, the test should be conducted after the hot rinse bath but before the rust inhibitor bath. The test uses the interaction of the steel surface and solutions that vary in alcohol to water ratios. The higher the amount of alcohol, the easier the solution will spread by overcoming surface tension energies on the steel. The cleaner the steel, the lower the amount of alcohol in the solution required to overcome surface energies. 10 bromothymine blue (BNB) solutions with 1.5 g per 100 mL are prepared and put into dropper bottles. The results are then compared against the following rating table:

Rating Table

| Rating | BMB Solution | Methanol | Water | Remarks |
|---|---|---|---|---|
| 0 | 8 | 72 | 0 | Poor |
| 5 | 8 | 68 | 4 | Poor Plus |
| 10 | 8 | 64 | 8 | Pair Minus |
| 20 | 8 | 56 | 16 | Fair |
| 30 | 8 | 48 | 24 | Fair Plus |
| 40 | 8 | 40 | 32 | Good Minus |
| 50 | 8 | 32 | 40 | Good |
| 60 | 8 | 24 | 48 | Good Plus |
| 70 | 8 | 16 | 56 | Excellent |
| 80 | 8 | 8 | 64 | Excellent |

The steel cores that are fresh from the hot rinse bath must be tested at a 60 rating or better to pass the cleanliness test. As the steel cores are exposed to the shop air, the rating will quickly deteriorate over time (an 80 rated steel core will deteriorate to a 60 rating after 40 minutes).

4. Dipping of Steel Cores in Enamel Slip

The liquid enamel is pumped from the storage tank into a dipping tank using an air operated diaphragm pump. The dipping tank is approximately 18 inches deep by 72 inches long by 12 inches wide with drip trays on each side. The tank is followed by 20 feet of drip trays used to catch the drips for the purpose of reclaiming the dripped coating for reuse. The threaded studs on each of the pipe cores are covered as described previously with sections of ¼ inch interior diameter PVC plastic tubing which is closed at one end to prevent enamel from coating the threads of the studs. The tube is then picked up by hand and dipped into the enamel slip and slushed around to ensure that no air remains inside the steel cores. The coated steel cores are then withdrawn from the slip and hung to a furnace chain using 330 s.s alloy "S" hangers. The steel cores are allowed to travel on the furnace chain for two to three minutes to allow the liquid slip to stabilize and stop dripping from the ends of the cores. At that point, the PVC plastic sleeves positioned over the studs are removed for reuse and any beads of enamel that have formed at the bottom of the cores is removed to ensure that there is no excessive buildup of enamel on the steel core.

Coating that has dripped from the steel cores onto the trays is salvaged into a holding tank for collection. Care is taken that there is no contamination of the reclaimed material due to sloppy shop practices. The collected material is returned to the mill room area where it is mixed using a high sheer "dissolver" type mixture and adjusted for a specific gravity. The addition of water is usually required due to the evaporation process that takes place on the drip trays. The resultant reclaimed slip is then passed through the vibrating screener and magnetic separator and subsequently readjusted for viscosity and pickup. The reclaimed enamel slip may then be reused at a rate of up to 25% after checking the coating integrity by processing a sample of 100% reclaimed slip. Excess reclaimed amounts may cause rheological instability resulting in coating thickness variations.

5. Firing of Coated Steel Cores

The steel cores are processed through a gas fired radiant tube furnace and are drawn through the furnace by an overhead conveyor chain. The conveyor chain carries 330 stainless steel racks through the furnace suspended by a series of alloy drop rods connected to the conveyor. The coated cores are suspended from the racks using alloy "S" type hooks. The furnace is broken into four zones for purposes of temperature control with the set points all at 1560° F. The chain speed is adjusted to allow the coated cores approximately 3½ to 4 minutes in the hot zones of the furnace. Once the cores have cooled sufficiently to allow handling, they are off loaded from the furnace chain for inspection. Cores requiring an additional coating are passed back to the dipping area for a repeat of the dipping process.

6. Testing of Coating

To determine if the coating has been processed properly, several tests are routinely conducted to ensure quality coating. A coated pipe section is selected periodically and cut using an abrasive wheel to a dimension of ½ inch wide by ½ long taking care to shield the coating surface from flying slag during the cutting process. The sample is mounted on a 30° polishing jig and fine polished as a standard metallurgical cross-section. Examination under a microscope with light field illumination should show an even distribution of small and medium sized bubbles throughout the thickness of the enamel. Any significant migration of the bubble structure away from the glass-metal interface indicates that excessive heat has been applied. Under dark field illumination, the area of the dissolved iron in the glass coating should be easily identifiable. This layer of dissolved iron should be ¼ to ⅓ of the enamel layer. Samples are also tested for mechanical adhesion of the glass coating to the steel. This is simply done by impacting the end of the tube with a hammer and observing the amount of glass that breaks off. No bare areas should be left on the steel. All areas of the steel should still have black glass tightly adhered to the surface. The presence of any bare (grey or silver) steel after impact constitutes a failure.

TESTING PIPE AT THE FACTORY

Figure 25:
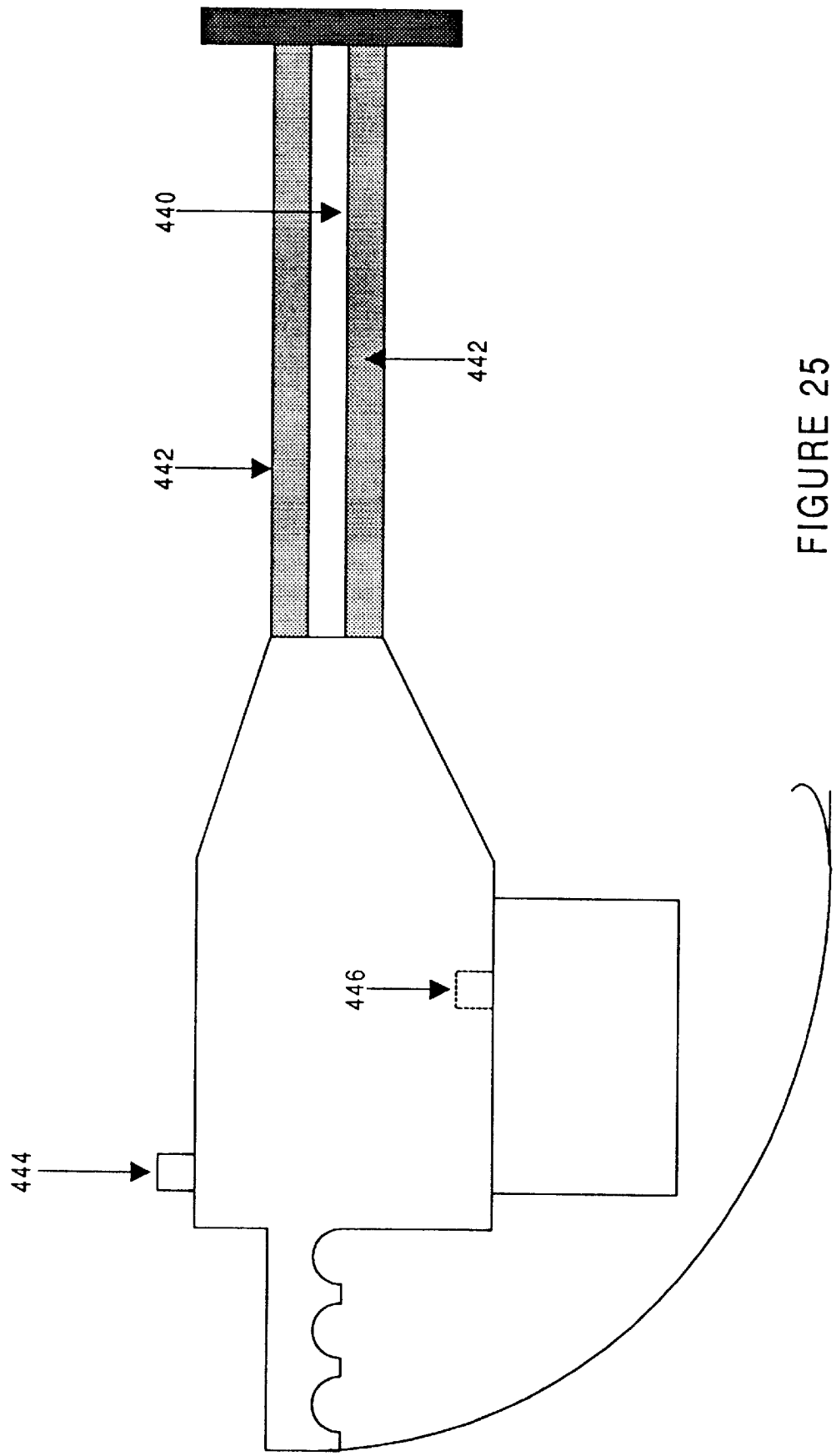
FIG. 25 is a side view of a factory pipe tester in accordance with the present invention.

In order to ensure product integrity and maintain an unquestionable level of product quality every piece of pipe is tested at the factory to ensure that pipes with flaws do not inadvertently get released into the field. This process is achieved through the use of a dielectric tester whereby by passing a round wire brush with 100 volts of electricity for every ¹⁄₁₀₀₀ of an inch of thickness of material to be tested through each and every piece of pipe it is ensured that no flawed pipe is released to the market place. The electrical arc will pass through dry air without actually touching the positive and negative leads at a commonly know rate of 100 volts for every ¹⁄₁₀₀₀ of an inch. Referring to FIG. 25, an alligator clip 436 is attached to the stud welded to the steel substrate prior to coating. Before applying the glass coating to the steel pipe, the exterior studs are covered with caps to prevent glass from covering the welded studs. It is important to keep the stud free of glass because glass would act as an insulator and prevent electrical current from passing freely through the metal substrate of the pipe to the outer surface of the exterior welded stud. The round wire brush 438 which is attached to a conductive rod 440 covered with a insulated coating 442 is inserted into each and every piece of pipe. As the wire brush is round in shape, all surfaces of pipe will be exposed to the high voltage potential created by the transformers built into the testers main body. The metal wire brush is positively charged and the alligator clip has the corresponding negative charge. As the glass coating acts as an insulator, the high voltage produced by the transformers in the tester will be unable to arc as long as the glass coating is continuous. However if there are any imperfections in the coating, a high voltage arc will pass from the positively charged wire brush to the negative lead made by the alligator clip 436. To actually conduct the test, the negative lead with alligator clip 436 is connected to the bare exterior welded stud of the pipe sections. Then the positively charged wire brush 438 is inserted into the centre of the glass coated pipe sections by inserting the insulated lance completely through the pipe section. If there is a flaw in the pipe the size of an electron the electricity from the wire brush will arc completing the circuit and causing an audible alarm with light 444 to sound. Should this occur the offending pipe is returned for an additional coat of porcelain and will be rechecked prior to its being deemed acceptable for release to the marketplace. The dielectric tester can be adjusted to test pipe at voltage ratings ranging from 500 volts to 2500 volts by adjusting the voltage adjustment screw 446. Because the conductive rod 440 is not flexible in order to test 45° and 90° degree angles the pipe must be turned and be checked from both the male and female end. Alternately the rod can be made from a flexible cable with insulated coating to allow the wire brush to negotiate curves. Because glass does not coat on sharp edges adequately an alarm sounding at the male end of the pipe which will be covered by VITON™ will not be rejected.

PORTABLE PIPE TESTING APPARATUS

Figure 26:
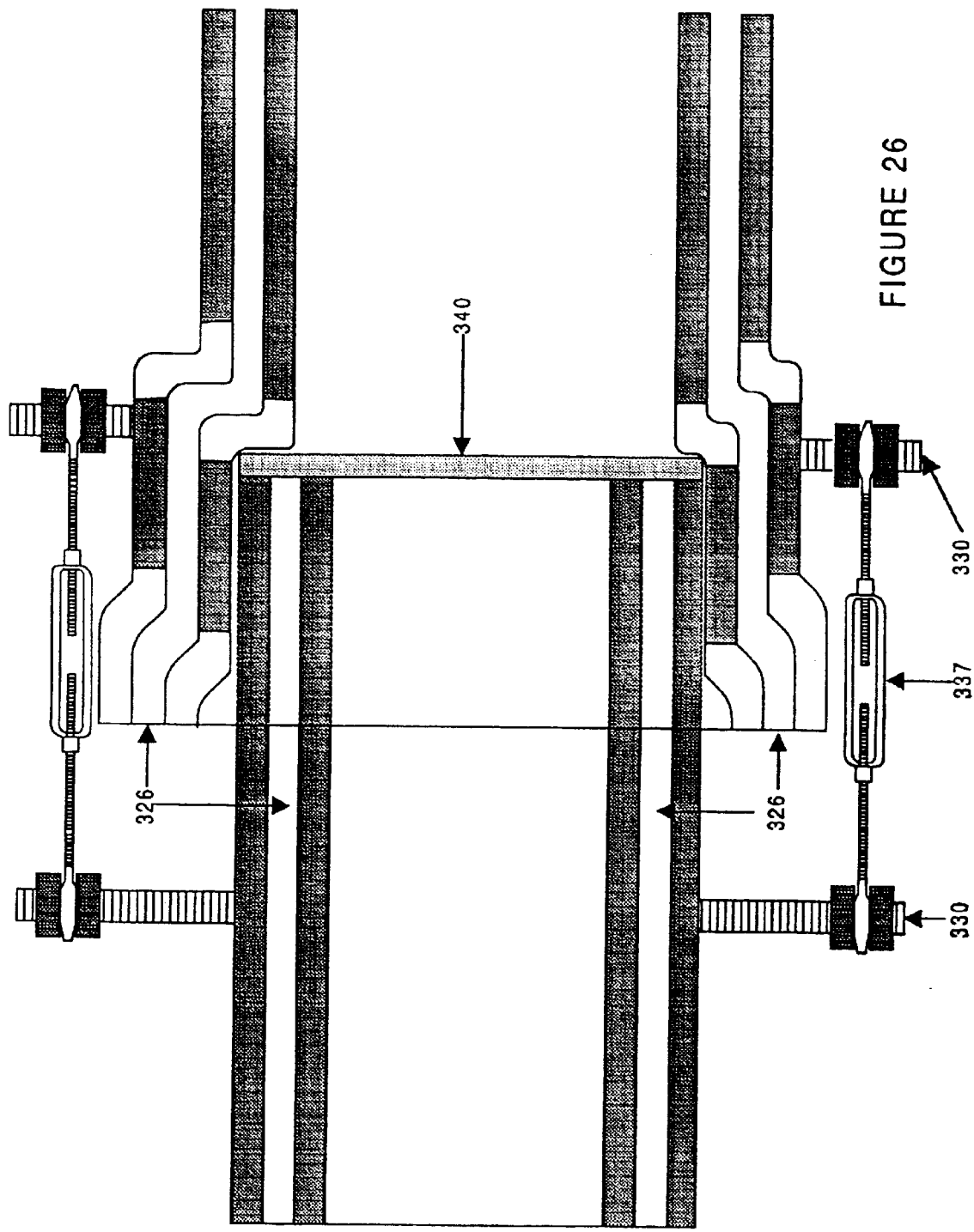
FIG. 26 is an enlarged sectional view of interconnected pipe sections showing the electrical continuity between the sections.
Figure 27:
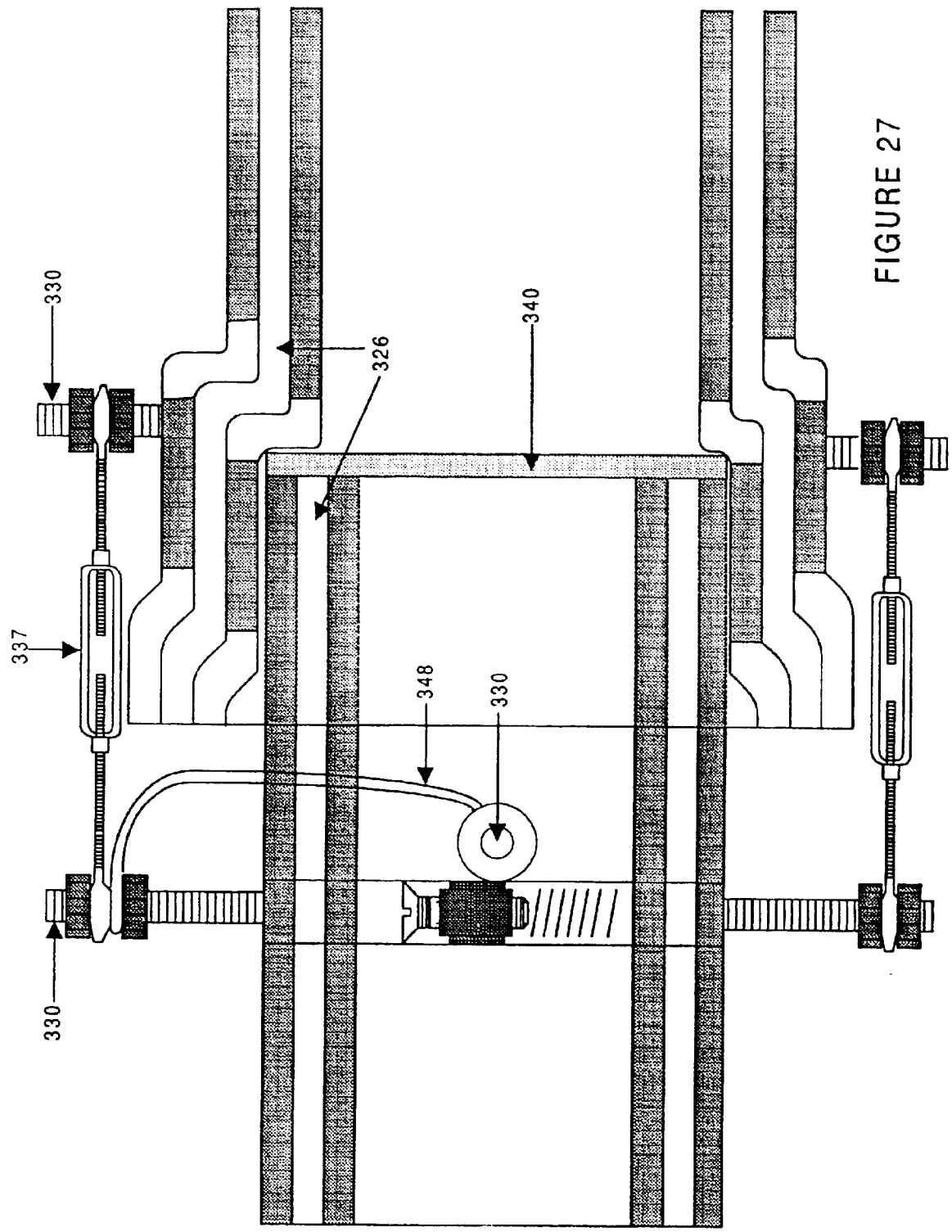
FIG. 27 is an enlarged sectional view of interconnected pipe sections showing a jumper wire and studded gear clamp in accordance with the present invention.

Once the pipe system is installed in a building, it is desirable to test periodically that no flaws in the glass coating are present. Since the individual sections of pipe have an insulating interior glass coating along the main body of the pipe, and the ends of the pipe have a protective VITON™ gasket and electrical current will not be able to pass from one section of pipe to the next adjoining section of pipe, there must be be a provision to allow substrates of one pipe section to complete the electrical circuit with the substrate of the adjoining section of pipe. This is possible due to having the studs 330 which are free of any insulating materials welded to the steel substrate 326 prior to coating. Referring to FIG. 26, and observing the darkened outlines in the diagram referring to the steel substrate 326 it is shown that there is a continuous electrical circuit. This is made possible due to the use of metal turnbuckles 337 which conduct electricity as they joint one stud to another which are both welded directly to the steel substrate. As long as there is a continuous electrical circuit created by joining the studs, which are welded to the substrates of the adjoining sections of pipe, together by turnbuckles, then the entire pipe system can be tested by employing the portable dielectric tester. When elbows need to be rotated the studs which are welded to the metal substrate will not align with the studs welded to the metal substrate on the adjoining section of pipe. Under this set of circumstances a gear clamp with studs must be utilized to allow 360° rotation. When a studded gear clamp is employed (refer to FIG. 27) the electrical circuit would not be complete as the turnbuckle attaching directly to the studded gear clamp would not be a part of the circuit as it is not in direct contact with the steel substrate which is necessary to maintain the circuit. This is overcome by using the jumper wire 348 which connects the gear clamp to the steel substrate of the adjoining section of pipe and allows for an uninterrupted circuit from one end of the entire pipe system which utilizes multiple individual pipe sections to the other end of the system and will allow for the testing of the integrity of the entire system.

Figure 28:
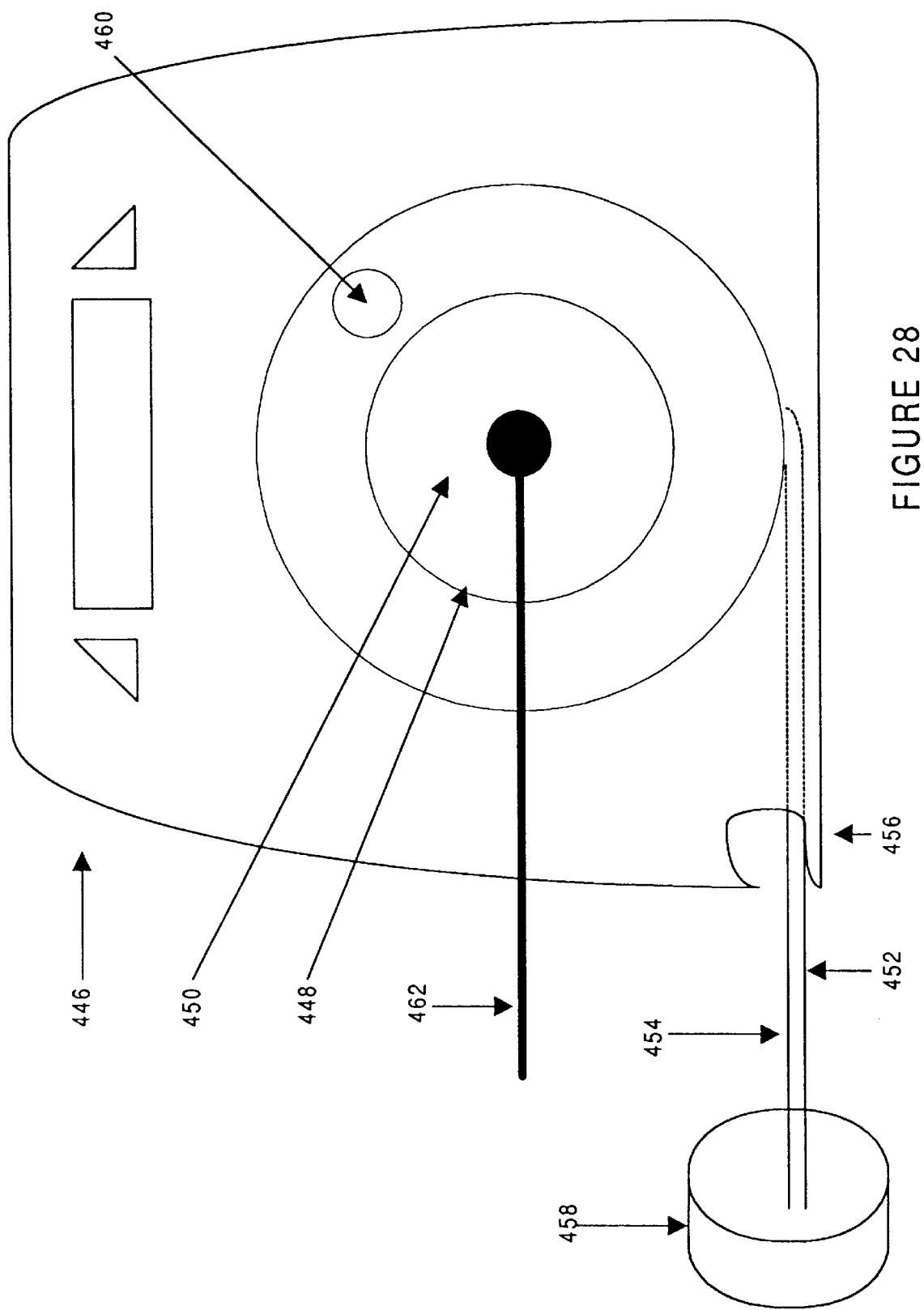
FIG. 28 is a side view of a second embodiment for a portable pipe tester in accordance with the present invention.
Figure 29:
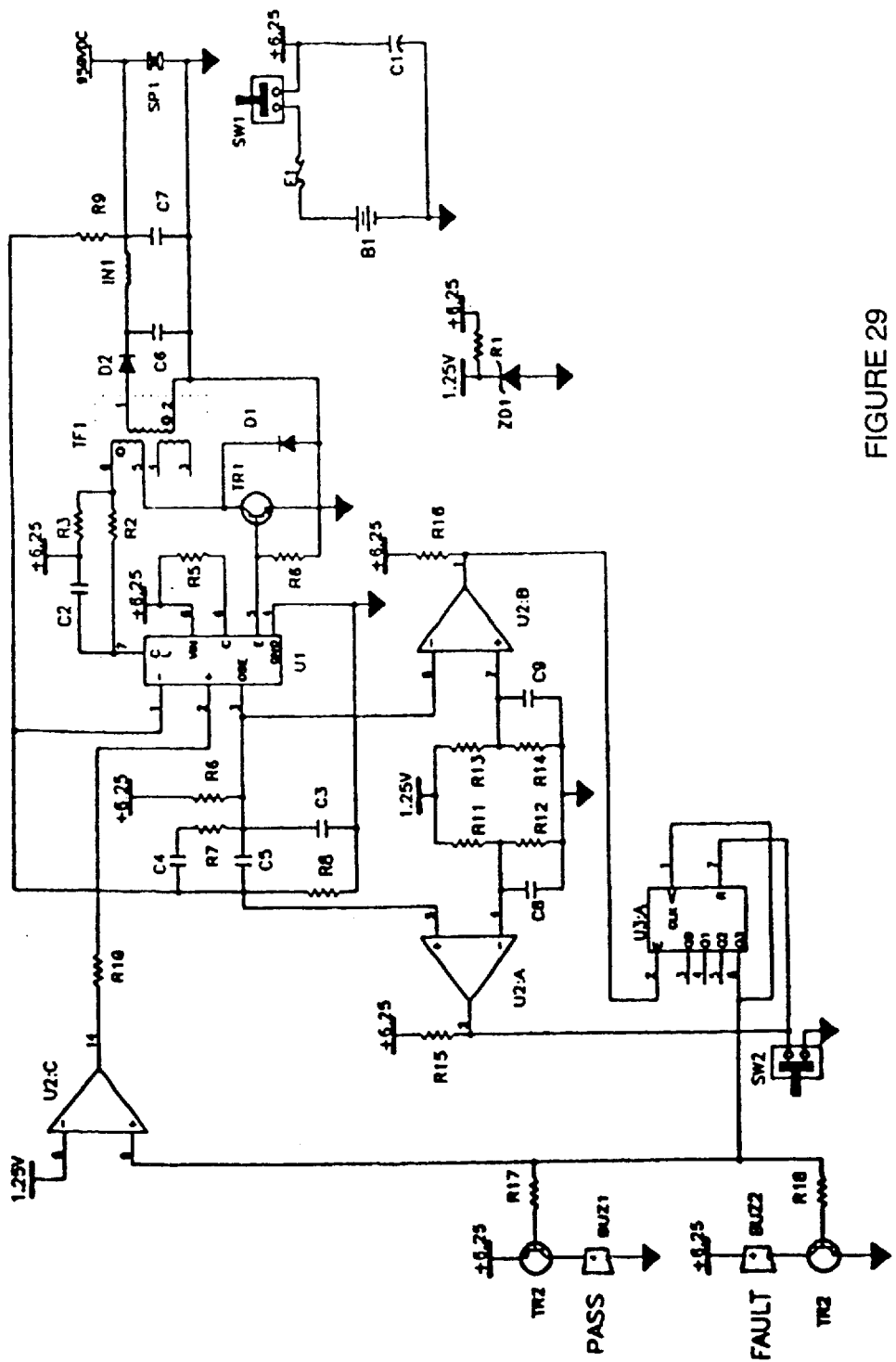
FIG. 29 is a circuit diagram for the pipe tester of FIG. 28.

Referring to FIGS. 28 and 29, a pipe tester in accordance with the present invention, is shown generally at 446 in FIG. 28. A circuit diagram for the pipe tester is shown in FIG. 29. The pipe tester comprises a housing 48 contained in a 1000 volt transformer 450. A nave lead 462 extends from the transformer for connection to the stud located on the last pipe section of the pipe system.

The transformer is connected to an elongate snake 452 for ending into the interior of the pipe system. The make is formed of any suitable material that provides sufficient axial stability to facilitate pushing of the snake through the pipe system without the snake bending upon itself. The outer casing 454 of the snake surrounds an electrical wire 456 that connects to the positive terminal of the transformer. The other end of the wire connects to a steel brush 458 as shown in FIG. 28. The steel brush has a plurality of steel bristles that are adapted to engage the inner circumference of the pipe sections. Preferably, the housing includes a winding mechanism and a storage cavity for winding the snake into the cavity for storage and transport. The housing includes a handle 464 to facilitate carriage of the apparatus.

When a sufficient current is conducted through the electrical wire 456 to the steel brush 458, an electrical arc will occur (ie a circuit will be completed) whenever a pinhole or other flow in the glass coating is located adjacent the steel brush. The completed circuit will trigger an alarm 460 located in the housing of the tester. This allows the operator to identify when the steel brush has located a flaw in the glass coating. By measuring the length of the make that remains extended into die pipe system, the operator can determine the specific pipe section containing the flaw.

METHOD FOR TESTING PIPE SYSTEMS FOR FLAWS

To test for flaws in the pipe system, the following steps are preferably followed. First, the operation ensures that the pipe system is fully installed and that all electric wire connectors between studs are secured. The operator then checks continuity over the piping system by attaching one lead of a continuity tester to the studs located at the ends 310, 316 of the pipe system. If electric continuity is established, the operator then goes outside of the building and proceeds to feed the snake through the vent opening and into the pipe system. A negative lead extends from the transformer for connection to the stud located on the last pipe section of the pipe system. Once the steel brush has extended fully to the far end 310 of the pipe system, the operator engages the power to the transformer and begins slowly winding or otherwise drawing the snake back through the pipe system. If an alarm sounds, the tester determines the position of the steel brush within the pipe system to identify the position of the flaw. The operator then continues winding the snake and identifying the location of flaws in the system. Once the entire system has been tested, the operator disengages the power and proceeds to replace those pipe sections where flaws have been identified.

It is to be understood that what has been described is a preferred embodiment to the invention. If the invention nonetheless is susceptible to certain changes and alternative embodiments fully comprehended by the spirit of the invention as described above, and the scope of the claims set out below.

I claim:

1. A pipe section for a piping system, comprising:
   a hollow core defining an internal passageway, said core having a male end and a female end, said ends opening to said passageway said female end being sized to receive a male end of an adjacent pipe section in a substantially sealed fit;
   a stud protruding externally from said core, said stud being sufficiently connected to said core to permit an electric charge to be conducted between and along said core and said stud; and
   a glass coating disposed continuously over the surface of said passageway wherein said pipe section is adapted for testing for flaws in said glass coating when the electric charge is conducted along said core.

2. A pipe system comprising:
   a plurality of interconnected pipe sections defining a continuously sealed passageway each said pipe section having a hollow core defining a portion of said passageway, said core having an open male end and an open female end, said female end being sized to receive a male end of an adjacent pipe section in a substantially sealed fit;

a stud protruding externally from said core of each said pipe section, said stud being connected to said core to permit an electric charge to be conducted between and along said core and said stud; and a glass coating disposed continuously over an inner surface of said passageway for each said pipe section wherein said pipe system is adapted for testing for flaws in said glass coating when the electric charge is conducted along said core.

3. A piping system as claimed in claim 2, wherein one of said pipe sections comprises a condensate tee having a tee flange protruding externally from said core between said male and female ends, said tee flange defining an external opening from said passageway.

4. A piping system as claimed in claim 3, wherein said pipe sections include straight sections, elbow sections and said condensate tee section.

5. A piping system as claimed in claim 2, further comprising means for supporting said interconnected pipe sections at a slope relative to a horizontal plane.

6. A pipe system as claimed in claim 3, wherein a conduit extends between said tee flange and a drain receptacle.

7. A pipe system as claimed in claim 2, wherein an electric connector extends between each stud of adjacent pipe sections to permit an electric charge to be conducted along all of the interconnected cores.

8. An arc tester for testing a hollow pipe having a glass coated internal surface comprising:

an electric power supply;

an electrically conductive body having means for electrically contacting the glass coated internal surface of the pipe;

a first electric connector for electrically connecting said body to said power supply;

a second electric connector for electrically connecting said pipe to said power supply; and means for sensing when an electric circuit is completed between said body and said pipe.

9. An arc tester as claimed in claim 8, further comprising means for moving said body from one end of said pipe to another.

10. An arc tester as claimed in claim 8, further comprising an audible alarm electrically connected to said sensing means for emitting an audible signal when said completed circuit is sensed.

11. An arc tester as claimed in claim 8, further comprising a visible alarm electrically connected to said sensing means for emitting a visible signal when said completed circuit is sensed.

12. A method of testing a hollow pipe having a glass coated internal surface comprising the steps of:

electrically connecting the pipe to an electric power supply;

electrically connecting an electrically conductive body to said power supply, said body having means for electrically contacting the glass coated internal surface of the pipe;

activating said power supply;

moving said body from one end of said pipe to the other;

sensing when an electric circuit is completed between said body and said pipe; and determining the position of said body relative to said pipe when said circuit is sensed to locate the position of a flaw in said glass coating.

* * * * *

UNITED STATES PATENT AND TRADEMARK OFFICE
CERTIFICATE OF CORRECTION

PATENT NO. : 5,812,062
DATED : September 22, 1998
INVENTOR(S) : Michael Lee Roberts It is certified that error appears in the above-identified patent and that said Letters Patent is hereby corrected as shown below:

After Claim 12, Column 28, Line 36 add the following claims 13-29:

13. A pipe section as claimed in claim 1, wherein said core is made from electrically conductive material.
14. A pipe section as claimed in claim 13, wherein said electrically conductive material is low carbon steel.
15. A pipe section as claimed in claim 13, wherein said stud is rigidly connected by welds to said core.
16. A pipe section as claimed in claim 13, further comprising a protective covering for the end face of said male end of said core to protect said male end from exposure to corrosive materials.
17. A pipe section as claimed in claim 16, wherein the material for said protective covering is selected from one of the following materials: fluorelastomere, ethylene-propylene, chloroprene, nitrile or perflouro elastomer.
18. A pipe section as claimed in claim 16, wherein said protective covering comprises a gasket ring fitted over said end face of said male end of said core.
19. A pipe section as claimed in claim 18, wherein said gasket ring is mounted to said end face of said male end of said core using a fluorelastomere caulking.
20. A pipe section as claimed in claim 13, further comprising a glass coating disposed over the outer surface of said core.
21. A pipe section as claimed in claim 13, wherein said female end has a bell configuration to allow said male end of said adjacent pipe section to penetrate said female section without requiring a change in the inside diameter of said female end.
22. A pipe system as claimed in claim 2, wherein said pipe sections are electrically connected together to facilitate an electric charge being conducted along said cores, each said core being made from an electrically conductive material.
23. A pipe system as claimed in claim 22, wherein said pipe system is connected at one end to a mid-efficiency heating appliance and at the other end to an exhaust port for exhausting gases outdoors.
24. A pipe system as claimed in claim 22, wherein said passageway slopes downwardly at least 1/4 inch per foot from said exhaust port toward said heating appliance.
25. A pipe system as claimed in claim 22, further comprising adjustable connectors for mounting to said studs of adjacent pipe sections to mechanically draw said pipe sections together.

UNITED STATES PATENT AND TRADEMARK OFFICE
CERTIFICATE OF CORRECTION

PATENT NO. : 5,812,062
DATED : Sept. 22, 1998
INVENTOR(S) : Micheal Lee Roberts

It is certified that error appears in the above-identified patent and that said Letters Patent is hereby corrected as shown below:

26. A pipe system as claimed in claim 22, wherein said pipe sections are oriented with said male ends upstream relative to a condensate flow within said passageway.
27. An arc tester as claimed in claim 8, wherein said electrically conductive body is a steel brush which has a plurality of steel bristles adapted to engage said glass coated internal surface of said pipe section.
28. A method of testing as claimed in claim 12, further comprising, for pipes having a plurality of connected pipe sections, the initial step of electrically connecting adjacent pipe sections together to facilitate an electric charge being conducted over the length of said pipe, each said pipe section being made from an electrically conductive material.
29. A method as claimed in claim 12, wherein said body comprises a brush having a plurality of electrically conductive bristles for contacting the internal surface of said pipe.

Signed and Sealed this

Third Day of August, 1999

Attest:

Q. TODD DICKINSON

Attesting Officer

Acting Commissioner of Patents and Trademarks